United States Patent
Bradford et al.

[11] Patent Number: 5,956,745
[45] Date of Patent: Sep. 21, 1999

[54] SYSTEM AND METHOD FOR AUTOMATICALLY RESIZING A DISK DRIVE VOLUME

[75] Inventors: Ted Kelly Bradford, Springville; Cort D. Ouderkirk, Provo; Nicholas Huston Franklin, Lehi, all of Utah

[73] Assignee: Novell, Inc., Provo, Utah

[21] Appl. No.: 08/842,064

[22] Filed: Apr. 23, 1997

[51] Int. Cl.[6] .................................................. G06F 12/02
[52] U.S. Cl. ........................ 711/137; 707/205; 707/206; 360/48
[58] Field of Search .......................... 711/173; 707/205, 707/206; 360/48; 395/425, 438, 439, 497.01–497.04, 616, 617, 618, 619, 620, 621, 622, 750, 800

[56] References Cited

U.S. PATENT DOCUMENTS

| | | | |
|---|---|---|---|
| 4,601,012 | 7/1986 | Aiken, Jr. ................................ | 364/900 |
| 5,129,088 | 7/1992 | Auslander et al. ..................... | 395/700 |
| 5,363,487 | 11/1994 | Willman et al. ....................... | 395/275 |
| 5,438,671 | 8/1995 | Miles ...................................... | 395/200 |
| 5,485,321 | 1/1996 | Leonhardt et al. ..................... | 360/48 |
| 5,491,807 | 2/1996 | Freeman et al. ....................... | 395/401 |
| 5,546,577 | 8/1996 | Marlin et al. .......................... | 395/600 |
| 5,675,769 | 10/1997 | Ruff et al. .............................. | 711/173 |
| 5,706,472 | 1/1998 | Ruff et al. .............................. | 711/173 |
| 5,715,455 | 2/1998 | Macon, Jr. et al. .................... | 707/205 |
| 5,778,392 | 7/1998 | Stockman et al. ..................... | 707/205 |
| 5,808,821 | 9/1998 | Davy ....................................... | 360/48 |
| 5,832,525 | 11/1998 | Wong et al. ............................ | 707/205 |

*Primary Examiner*—Thomas C. Lee
*Assistant Examiner*—Mohamed Mashaal
*Attorney, Agent, or Firm*—Wolf, Greenfield & Sacks, P.C.

[57] ABSTRACT

An automatic volume block resizer for automatically resizing a volume in a disk drive system. The original volume includes original volume blocks each having an original volume block size, and the resized volume including new volume blocks each having a new volume block size. The volume block resizer comprises means for automatically aligning files contiguously on new volume block boundaries and means for redefining the volume for use with the new volume block size. The file aligning means comprises means for moving original volume blocks to available locations on the volume to create disk space equivalent to the new volume block size and to store the files on the new volume block boundaries. The files are stored contiguously; that is, they are defragmented as they are realigned onto the new volume block boundaries. The realignment is performed through the manipulation of original volume blocks of data. Also, an original file allocation table and a directory entry table are maintained throughout the volume resizing process to provide a recovery mechanism should the volume resizer be unable to complete resizing the volume. In addition, a new file allocation table is maintained during the resizing process. Once completed, the volume defining means comprises means for updating volume definition tables and partition information on the disk drive system with the new file allocation table and updated directory entry table reflecting the new volume block size. In one embodiment, the realigned and defragmented files include only files having a size equal to or greater than the new volume block size. The files and ending data fragments smaller than the new volume block size are suballocated. Also, in a preferred embodiment, the new volume block size is selected by the system administrator from a plurality of possible volume block sizes.

37 Claims, 20 Drawing Sheets

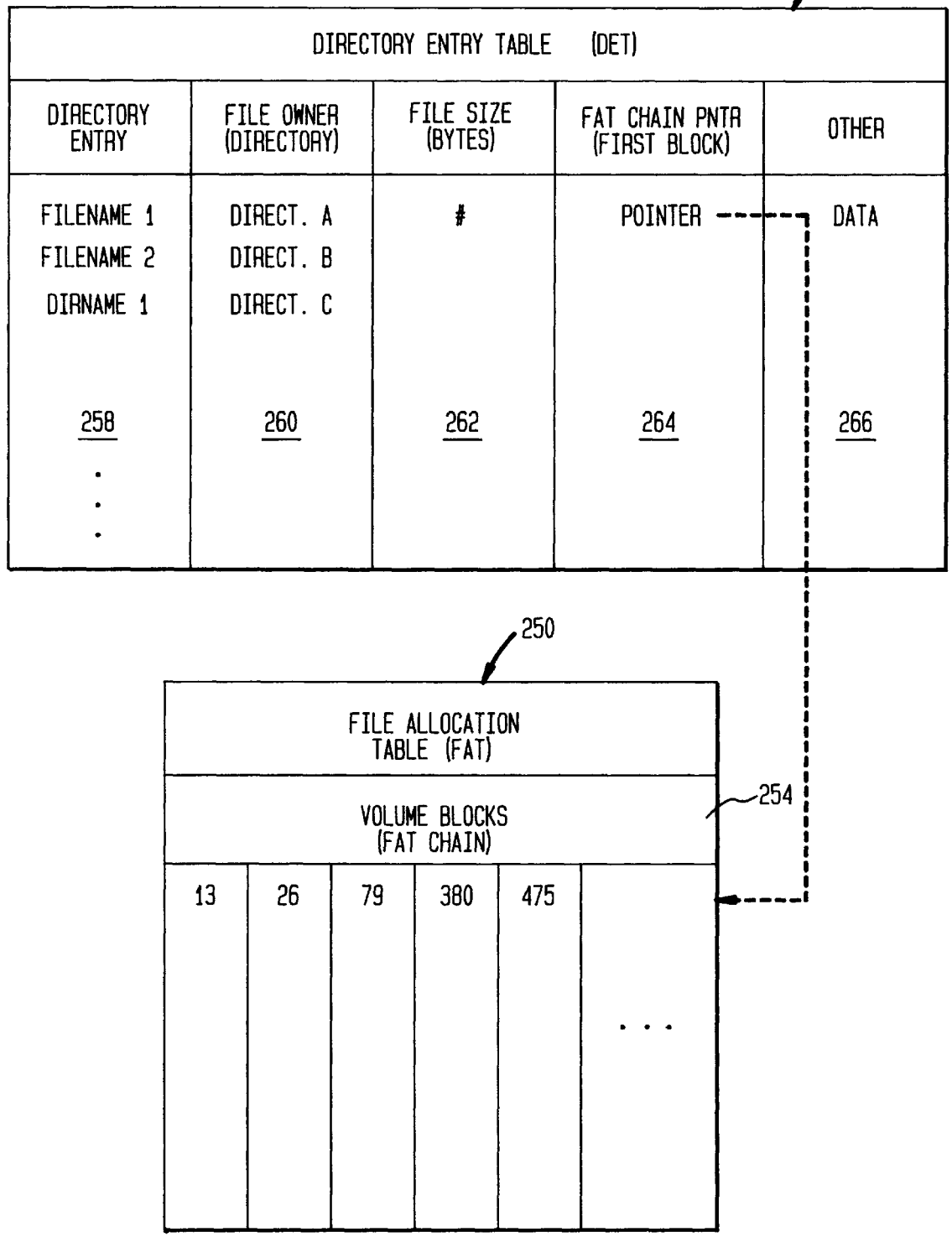

FIG. 6A

FAT-TO-DET TABLE — 602

| VOLUME BLOCK | DIRECTORY ENTRY POINTER |
|---|---|
| 1 | 135 |
| 2 | 135 |
| 3 | 65 |
| 4 | 675 |
| 5 | 65 |
| ⋮ | ⋮ |

DIRECTORY BLOCK TABLE — 604

DIRECTORY BLOCKS (VOLUME BLOCKS)

FIRST BLOCK NO.
SECOND BLOCK NO.

| ORIGINAL VOLUME FAT BIT-MAP TABLE | | | | | | | | | | | | | |
|---|---|---|---|---|---|---|---|---|---|---|---|---|---|
| BLOCK NUMBER | 1 | 2 | 3 | 4 | 5 | 6 | 7 | 8 | 9 | 10 | 11 | 12 | 13 ... |
| IN-USE | | | | | | | | | | | | | |

FIG. 6D

| NEW VOLUME FAT BIT-MAP TABLE | | | | | | | | | | | | | |
|---|---|---|---|---|---|---|---|---|---|---|---|---|---|
| BLOCK NUMBER | 1 | 2 | 3 | 4 | 5 | 6 | 7 | 8 | 9 | 10 | 11 | 12 | 13 ... |
| IN-USE | | | | | | | | | | | | | |

FIG. 6E

| DIRECTORY ENTRY LARGE FILE BITMAP | | | | | | |
|---|---|---|---|---|---|---|
| DIRECTORY ENTRY | FILE | DIR | FILE | FILE | FILE | DIR ... |
| LARGE STATUS | | | | | | |

FIG. 6F

| DIRECTORY ENTRY SMALL FILE BITMAP | | | | | | |
|---|---|---|---|---|---|---|
| DIRECTORY ENTRY | FILE | DIR | FILE | FILE | FILE | DIR ... |
| SMALL STATUS | | | | | | |

FIG. 6G

SUBALLOCATION BIT MAP TABLE    0-512 BYTES (660)

| | SRB 1 | | | | | | | | SRB 2 | | | | | | | | ... |
|---|---|---|---|---|---|---|---|---|---|---|---|---|---|---|---|---|---|
| SUB-BLOCK | 1 | 2 | 3 | 4 | 5 | 6 | 7 | 8 | 9 | 10 | 11 | 12 | 13 | 14 | 15 | 16 | ... |
| IN-USE | 0 | 1 | 0 | 0 | 0 | 1 | 0 | 1 | 0 | 0 | 1 | 1 | 1 | 0 | 1 | 1 | ... |

FIG. 6H

SUBALLOCATION BIT MAP TABLE    513-1024 BYTES (662)

| | SRB 1 | | | | SRB 2 | | | | ... |
|---|---|---|---|---|---|---|---|---|---|
| SUB-BLOCK | 1 | 2 | 3 | 4 | 5 | 6 | 7 | 8 | ... |
| IN-USE | | | | | | | | | ... |

FIG. 6I

SUBALLOCATION BIT MAP TABLE    1025-1536 BYTES (664)

| | SRB 1 | | | SRB 2 | | | ... |
|---|---|---|---|---|---|---|---|
| SUB-BLOCK | 1 | 2 | 3 | 4 | 5 | | ... |
| IN-USE | | | | | | | ... |

FIG. 7

| NEW FILE ALLOCATION TABLE | | | | | | | | (702) |
|---|---|---|---|---|---|---|---|---|
| VOLUME BLOCKS (FAT CHAIN) | | | | | | | | (706) |
| 2 | 3 | | | | | | | |
| 4 | 5 | 6 | | | | | | |
| | | | | | | | | |
| | | | | | | | | |
| | | | | | | | | |

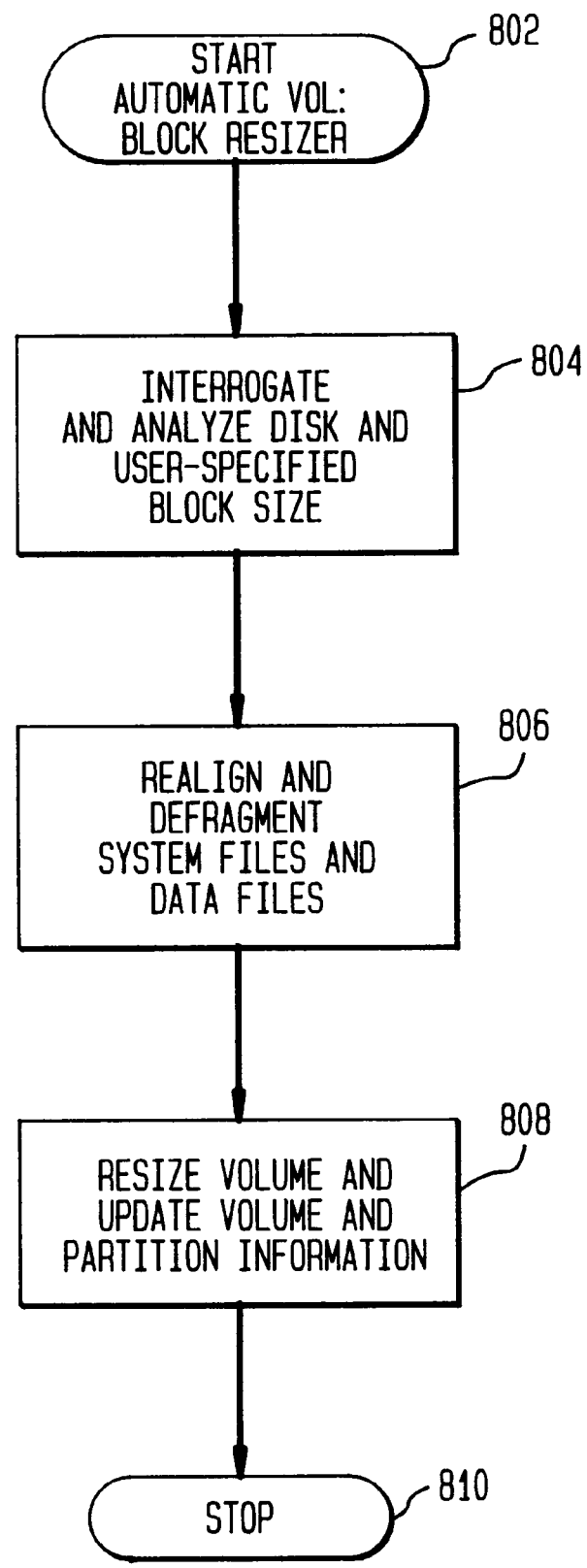

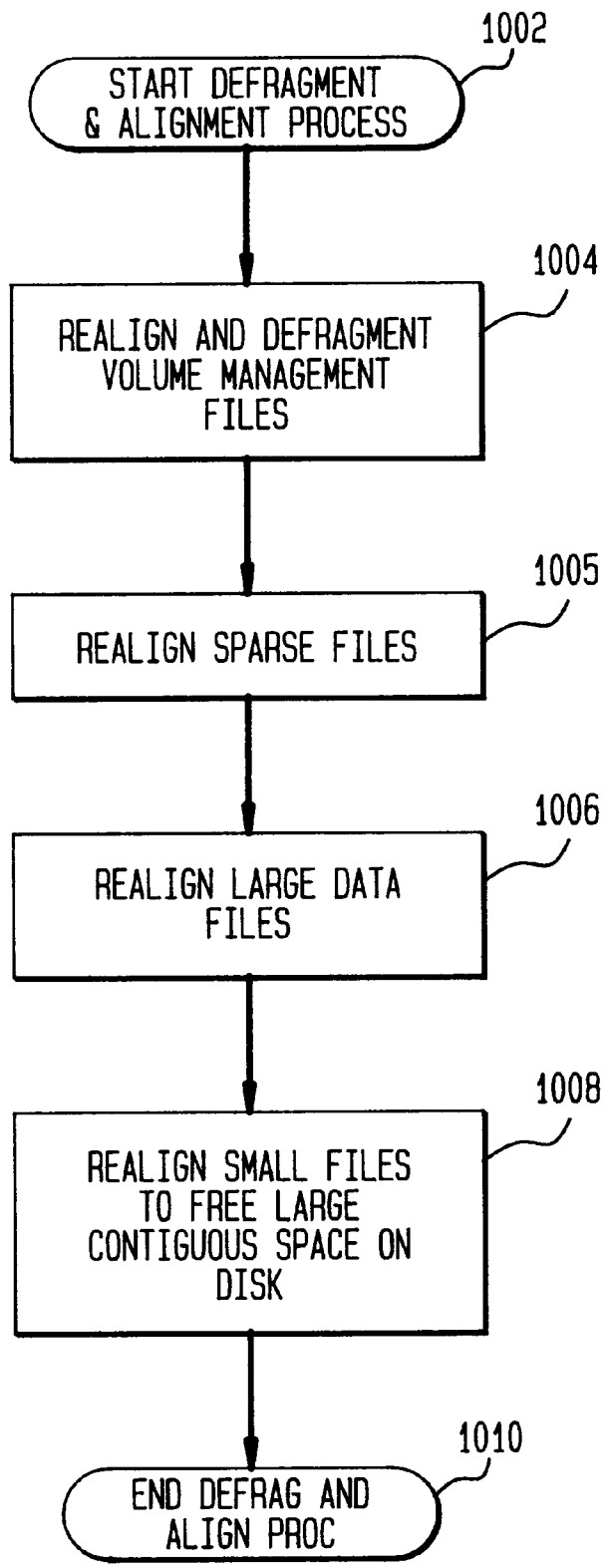

SYSTEM AND METHOD FOR AUTOMATICALLY RESIZING A DISK DRIVE VOLUME

BACKGROUND OF THE INVENTION

1. Field of the Invention

The present invention relates generally to computer disk drives and, more particularly, to the creation and modification of volumes in computer disk drive systems.

2. Related Art

As part of an operating system installation on a network server, a system administrator also configures the disk drive system. Generally, the system administrator installs disk drivers appropriate for the disk controller and sets various parameters to configure the disk drive system. There are a number of configurable features or characteristics of the disk drive system, including the number of volumes the disk drive will include and the number of segments per volume. Volumes are logical portions of disk space created and controlled by a network operating system. Segments are independently-accessible portions of a volume; each volume may be logically divided into one or more segments. The disk drive system may be configured to include one or more volumes on a single physical disk or a single volume may span more than one disk in the disk drive system.

There are a number of advantages and disadvantages associated with each of these configurations. For example, including multiple volumes on a single disk is advantageous in that security is easier to control on a per-volume basis. Also, descriptive naming options are available to clearly identify logical groups of information stored in the disk drive system. On the other hand, artificial segmentation of a disk chops up available disk space and additional effort is required to configure a back-up system by volume.

One of the more common advantages to spanning a volume across multiple disks is the associated increase in performance. Different segments of a volume that are located on different disks may be accessed simultaneously. A drawback to this approach, however, is that the occurrence of a single disk drive fault requires the restoration of the entire multi-disk system. This drawback can be overcome by configuring mirrored or duplexed drives. If one of the drives does crash, the fault-tolerance built into the mirrored system keeps the server up and running. When the drive is replaced, it merely needs to be synchronized with the remaining good drive of the pair to once again be ready for service.

Another configurable feature of the disk drive system is the volume block size. A volume block is the minimum file allocation unit for server disk drives. The size of the volume blocks determines the size of the pieces of data stored in a volume. Volume block size is analogous to the well-known cluster size used in personal computer disk drives.

There are a number of advantages associated with using larger volume block sizes. Disk access time is increased since each disk read and write operation is performed on a larger size piece of data. As a result, fewer disk access operations are required to read or write data to/from a file located on fewer volume blocks. In addition, utilization of a larger volume block size requires the use of less server random access memory (RAM) since there are fewer volume blocks to manage. Further, larger block sizes enables read-ahead operations to operate faster.

However, at least one volume block is allocated for each file stored on the disk drive. Files that do not completely fit into a volume block prevent the remaining portion of the volume block from being used. As a result, larger block sizes prevent the complete utilization of disk space. Thus, even though disk storage space may be available, it cannot be used in systems having large volume block sizes. In addition, since each file requires at least one volume block, the most files that can be stored in a volume is determined by the number of available blocks in that volume. Thus, larger volume block size results in a fewer number of files stored in a volume.

This drawback may be alleviated if the operating system offers what is commonly referred to as suballocation. Suballocation enables more than one file to be stored in a volume block. When suballocation is enabled, the operating system designates specific volume blocks, referred to as suballocation reserved blocks (SRBs), to store a specific, typically narrow range of file sizes or ending data fragments. Ending data fragments are those portions of a file that partially fill a volume block. This provides for an increase in the performance of the operating system through the use of larger volume block sizes while minimizing the wasted storage area associated with larger block sizes. For example, the NetWare® operating system available from Novell, Incorporated, increases server performance by using larger disk block sizes and dividing each SRB volume block into 512-byte sub-blocks. (NetWare is a registered trademark of Novell, Incorporated). In some versions of the NetWare® operating system, the volume block sizes are 4 kilobytes. In other versions of NetWare®, the volume block size is configurable, and may be 4, 8, 16, 32 or 64 kilobytes. As a result of suballocation, the greatest amount of wasted space that will occur in the server disk drive systems is 511-bytes regardless of the size of the volume block.

A drawback to current operating systems is that once the volume block size is selected and the disk drive is configured, the size of the volume block cannot be easily or quickly changed. Such a change may be desired to derive the above-noted benefits with different configurations. Also, different operating system features require or at least optimally operate with certain disk drive system configurations. When upgrading an operating system, it may be desirable to change the volume block size to take advantage of operating system features which may not be operational when used with the original volume configuration.

Currently, to change the volume block size, the system administrator must back-up the data currently stored on the volume onto a back-up system. Such a back-up system may be, for example, a tape drive system. Once a duplicate copy of the data on the disk drive system is stored on the back-up system, the system administrator then deletes the volume and recreates a new volume with the new volume block size. Once this new volume is created, the administrator must then restore the data stored on the back-up system back onto the reconfigured disk drive system. This process has been found to be time consuming and potentially dangerous to the integrity of the data. Furthermore, the time required to change the volume block size adversely impacts the availability of the system.

What is needed, therefore, is a means for converting the current volume block size in a disk drive system to a new volume block size without requiring the administrator to delete the original volume and rebuild it with the new volume block size. Such a system should not threaten the integrity of the data and should be capable of being performed efficiently so as to minimize the time the computer system is unavailable to the operating system and users.

SUMMARY OF THE INVENTION

The present invention includes an automatic volume block resizer for automatically resizing a volume in a disk drive system. The original volume includes original volume blocks each having an original volume block size, and the resized volume including new volume blocks each having a new volume block size. The automatic volume block resizer enables a system administrator to quickly and efficiently resize a volume without having to back up the data on the volume, without adversely impacting the availability of the volume for an extended period of time and without risking the integrity of the data stored on the volume.

In one aspect of the invention, the volume block resizer comprises means for automatically aligning files contiguously on new volume block boundaries and means for redefining the volume for use with the new volume block size. The file aligning means comprises means for moving original volume blocks to available locations on the volume to create disk space equivalent to the new volume block size and to store the files on the new volume block boundaries. The files are stored contiguously; that is, they are defragmented as they are realigned onto the new volume block boundaries.

The realignment is performed through the manipulation of original volume blocks of data. Also, an original file allocation table and a directory entry table are maintained throughout the volume resizing process to provide a recovery mechanism should the volume resizer be unable to complete resizing the volume. In addition, a new file allocation table is maintained during the resizing process. The volume defining means comprises means for updating volume definition tables and partition information on the disk drive system with the new file allocation table and updated directory entry table reflecting the new volume block size.

In one embodiment, the realigned and defragmented files include only files having a size equal to or greater than the new volume block size. The files and ending data fragments smaller than the new volume block size are suballocated. Also, in a preferred embodiment, the new volume block size is selected by the system administrator from a plurality of possible volume block sizes.

In another aspect of the invention, a system for resizing a volume of a disk drive system is disclosed. The original volume includes original volume blocks having an original volume block size. The resized volume includes new volume blocks having a new volume block size. The system comprises a disk analysis subsystem for obtaining volume-specific information from the disk drive system; a file defragmentation and realignment subsystem for defragmenting files on the volume and realigning the defragmented files on new volume block boundaries; and a volume definition subsystem for redefining the volume for use with the new volume block size.

The disk analysis subsystem creates various tables and bit-maps for use by the file defragmentation and realignment subsystem to simultaneously maintain an original file allocation table containing FAT chains of the original volume blocks and a new file allocation table containing FAT chains of the new volume blocks. The disk analysis subsystem accesses a partition information area and a volume definition area on the disk drive system to obtain the volume-specific information.

The file defragmentation and realignment subsystem moves the original volume blocks to available locations on the volume to create a disk space to store the defragmented files on the new volume block boundaries. Preferably, the blocks of data are moved towards an opposite end of the volume to avoid having to repeatedly move the volume blocks. The various tables and bit maps are then updated to reflect this block movement.

The file defragmentation and realignment subsystem preferably selects new volume blocks that require a fewest number of original volume blocks to be moved. Also, the file defragmentation and realignment subsystem preferably does not move files which currently begin on a new volume block boundary and are of a size equal to or greater than the size of the new volume block.

In one embodiment, the realigned and defragmented files include only files having a size equal to or greater than the new volume block size. In this embodiment, the files and ending data fragments smaller than the new volume block size are suballocated. The volume block resizer may be implemented in a stand-alone computer system or in a node of a distributed network.

In another aspect of the invention, a method for resizing a volume of a disk drive system is disclosed. The original volume includes original volume blocks each having an original volume block size. The resized volume includes new volume blocks each having a new volume block size. The method comprises the steps of: a) analyzing the disk drive system to obtain volume-specific information; b) contiguously realigning files on new volume block boundaries; and c) redefining the volume in the disk drive system.

In one embodiment, the method is preformed on system files and data files. In an alterative embodiment, only large data files are realigned. Files and ending data fragments that are smaller than the new volume block size are suballocated.

The analysis step of the disk drive system comprises the steps of: 1) obtaining current disk and volume information from the disk drive system; 2) selecting an unmounted volume as the volume to resize; 3) locking the selected unmounted volume; and 4) implementing suballocation if necessary. The analysis step may also include the steps of: 5) scanning local memory to verify that a sufficient amount of memory is available to resize the volume; and 6) create tables and bit-maps for storing the obtained volume-specific information. The analysis step may also include the steps of: 7) performing disk and volume calculations based upon the information obtained from the disk drive system; and 8) determining whether a sufficient amount of the volume blocks are available to resize the volume.

The realignment step comprises the step of: 1) aligning files that are equal to or greater than the new volume block size contiguously onto new volume block boundaries. Preferably, the realignment step also includes the step of 2) defragmenting and realigned volume management files on new volume block boundaries.

For each file to be defragmented and realigned, the realignment step comprises the steps of: (a) retrieving a FAT chain from the original file allocation table for the current file; (b) creating a new volume block to place a current file, the new volume block starting at a new boundary and extending for a number of original volume blocks that constitute a new volume block; (c) moving the original volume blocks of the current file into the cleared new volume block; and (d) updating the various tables and bit-maps to indicate each block move. Preferably, the process also includes the step of (e) updating the new FAT bit-map If said step (c) resulted in a new volume block becoming available.

Creating a new volume block comprises the steps of: (1) scanning a new volume FAT bit-map table to locate a new volume block that has no data stored in it; (2) updating, if a new volume block is identified, the new FAT bitmap to indicate that the identified new volume block is allocated to store the current file; (3) clearing, if there are no new volume blocks available, a sufficient number of original volume blocks to make a new volume block available; and (4) updating a new FAT bit-map table to indicate that this new volume block which has just been cleared is now allocated to a new file.

The defining volume step comprises the steps of: 1) writing the new volume FAT table and the directory entry table are written to the resized volume; 2) updating the volume definition tables to reflect the new volume block size; and 3) updating the operating system partition information to reflect the new volume block size.

Further features and advantages of the present invention as well as the structure and operation of various embodiments of the present invention are described in detail below with reference to the accompanying drawings. In the drawings, like reference numerals indicate identical or functionally similar elements. Additionally, the left-most one or two digits of a referenced numeral identifies the drawing in which the reference numeral first appears.

BRIEF DESCRIPTION OF THE DRAWINGS

This invention is pointed out with particularity to the appended claims. The above and further advantages of this invention may be better understood by referring to the following detailed description when taken in conjunction with the accompanying drawings, in which:

FIG. 2B is a diagram illustrating the relationship between a file allocation table (FAT) and directory entry table (DET) implemented in the disk drive system illustrated in FIG. 2A;

FIG. 6A is a diagram of a FAT-to-DET table created in accordance with the present invention;

FIG. 6B is a directory block table created by the disk analysis subsystem of the volume block resizer of the present invention;

FIG. 6C is a bit-map table showing the current usage of the original volume blocks created and maintained in accordance with the present invention;

FIG. 6D is a bit-map table showing the current usage of the new volume blocks created and maintained in accordance with the present invention;

FIG. 6E is a bit-map table illustrating whether a directory entry is a "large" directory entry that requires at least one new volume block to store the associated data;

FIG. 6F is a bit-map table illustrating whether a directory entry is a "small" directory entry that requires less than one new volume block to store the associated data;

FIGS. 6G–6I illustrate bit-map tables for suballocation reserved blocks (SRB) having 512-, 1024-, and 1536-byte sub-units;

FIG. 7 is a block diagram of a new file allocation table reflecting the allocation of files among created in accordance with the present invention;

FIG. 8 is a flow chart of the volume block resizing process performed by the present invention;

FIG. 10 is a high-level flow chart showing a preferred embodiment of the realignment and defragmentation process of the present invention;

DETAILED DESCRIPTION

Figure 1:
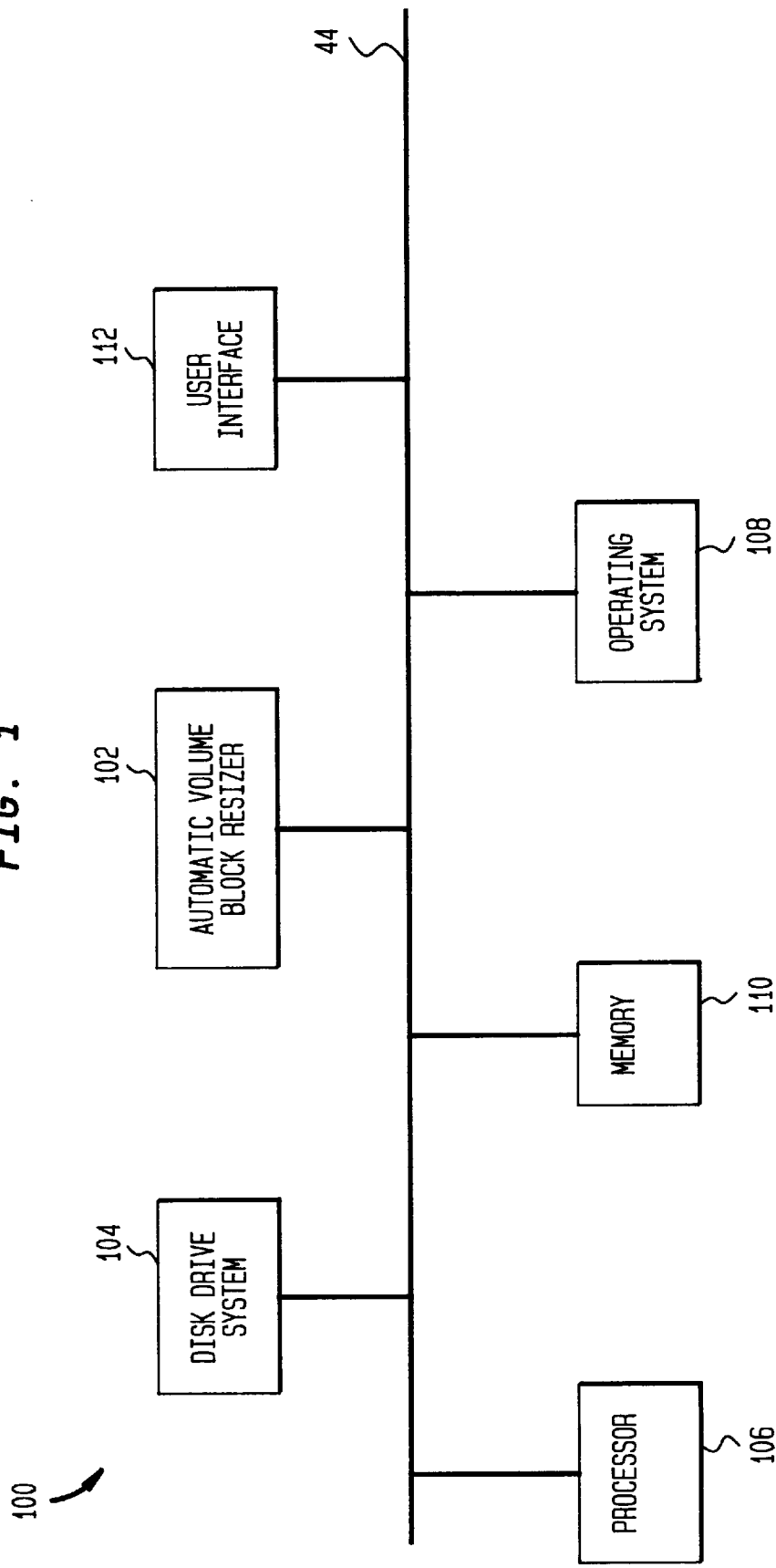
FIG. 1 is a functional block diagram of an exemplary computer system wherein the automatic volume block resizer of the present invention may be implemented.

The volume block resizer of the present invention may be implemented in any system architecture from a stand-alone computer system such as a personal computer, to a server or client node of a distributed network. FIG. 1 illustrates an exemplary computer system environment in which the volume block resizer of the present invention may be implemented.

The computer system 100 may be a general purpose computer system, which is programmable using a high-level computer programming language. The computer system 100 may also be implemented using specially programmed, special purpose hardware. The general purpose computer system 100 includes a commercially-available processor 106, such as the Pentium Microprocessor by Intell Corporation, PowerPC Microprocessor, SPARC Microprocessor, PA-RISC Microprocessor or 68,000 Series Microprocessor. Many other processors are also available. Such a processor 106 usually executes an operating system 108 which may be any well-known operating system providing an operating environment for the automatic volume block resizer 102. For example, the operating system 108 may be any one of the various versions of the Windows and DOS operating system from Microsoft Corporation, the Unix operating system available from many vendors, such as Sun Microsystems, Incorporated, Hewlett-Packard and AT&T, or the NetWare® operating system available from Novell, Incorporated. The processor 106 controls the execution of other computer programs that provides scheduling, debugging, input-output control, accounting compilation, storage assignment, data management, memory management, and communication control and related services. The processor 106 and operating system 108 define a computer platform for which application programs in high level programming languages are written.

The operating system interfaces with firmware and hardware (not shown) in a well-known manner to access a disk drive system 104, memory 110 and optional peripheral devices (not shown). The memory 110 may be any commonly available random access memory (RAM). A user or system to administrator has access to and control of information and operations on the computer system 100 through user interface 112. The disk drive 104 may be a resident hard drive having one or more physical disks described below with reference to FIG. 2A.

The volume block resizer 102 may be implemented as a software program running on the operating system 108, managing the resizing of volumes on the disk drive system 104 in accordance with the present invention as described below. The volume block resizer 102 is preferably configured as a generic software application capable of residing on any well-known computing platform, such as the computer system 100. In one embodiment of the present invention, the volume block resizer 102 includes implementing code written in the C programming language. The software routines for performing volume block resizing functions in accordance with the present invention typically reside in the memory 110 and may be stored on a computer-readable medium such as, for example, magnetic disk, compact disk, or magnetic tape, and may be loaded in the computer system 100 using an appropriate peripheral device as is known in the art. It should be understood, however, that the present invention is not limited to a particular computer platform, particular operating system, particular processor, or particular program language and/or algorithm. The exemplary embodiments identified above are given by way of example only and the invention may be implemented in a variety of computer systems having a variety of system architectures. In the following discussion, the present invention will be described as being implemented in a computer platform configured to perform network server functions.

In the embodiment wherein the operating system 108 is a NetWare® network operating system, the volume block resizer 102 is preferably implemented as a NetWare® loadable module (NLM), which is a program that can be loaded and linked to function as part of the network operating system 108. Generally, NLMs can be used to link different types of resources or services into the network operating system, making them available temporarily or for the entire time the network is running. For example, some NLMs, such as a LAN and disk drivers, will be loaded every time the network server is booted. On the other hand, some NLMs, such as management utilities and server application modules, are loaded temporarily to perform specific functions as they are needed. After NLM is loaded, the network operating system allocates memory for the NLM to use. This memory and any resources used, are returned for reuse when the NLM is unloaded. Preferably, the software implementation of the present invention is a utility NLM that is loaded temporarily by a system administrator to perform the automatic volume block resizing processes of the present invention.

Figure 2A:
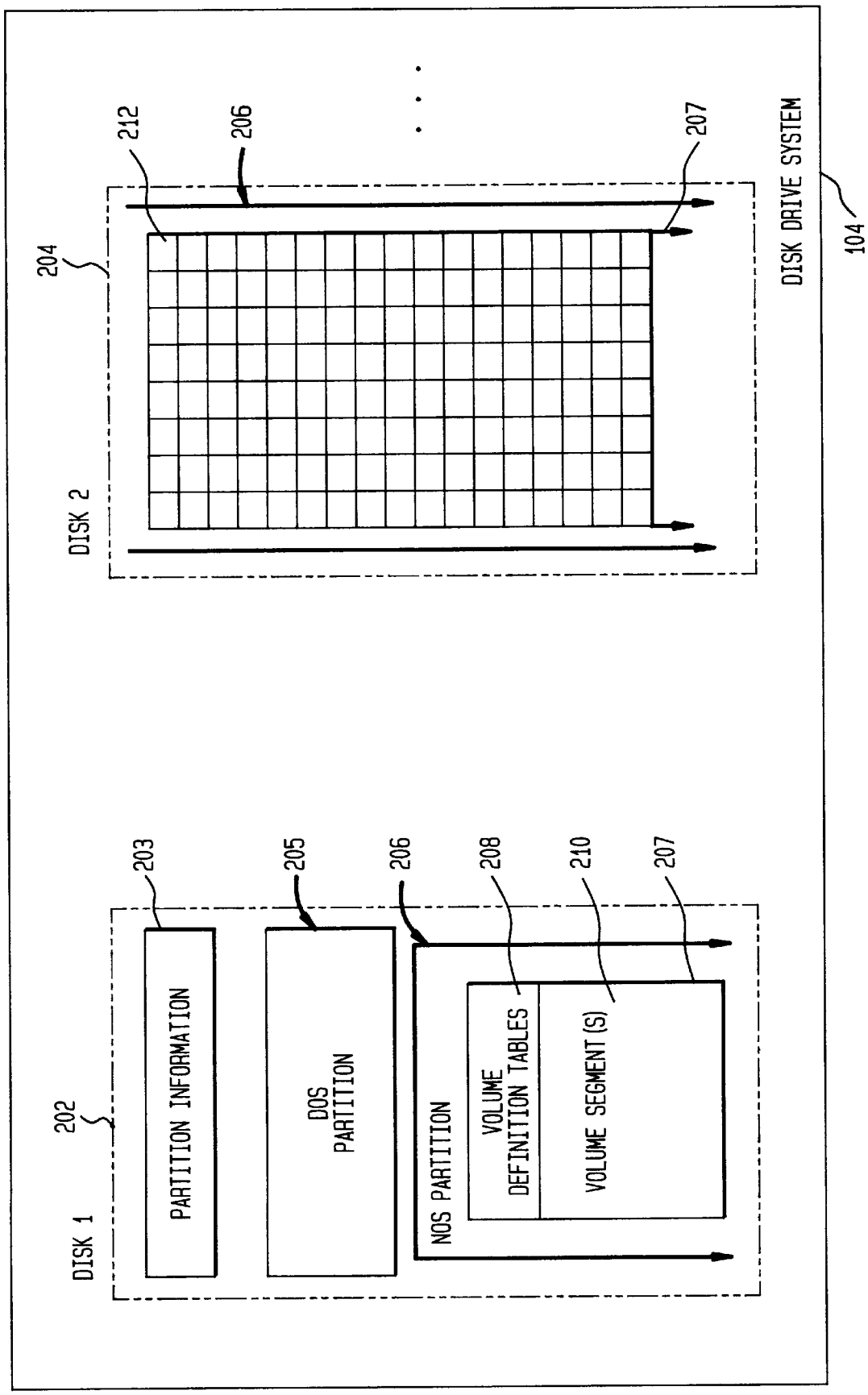
FIG. 2A is a block diagram of a partition, volume, segments and volume blocks of the disk drive system illustrated in FIG. 1.

FIG. 2A is a schematic block diagram of the disk drive system 104 illustrated in FIG. 1. The disk drive system 104 includes one or more physical disks such as disks 202 and 204. The disk drive system 104 typically contains many such disks, particularly in the exemplary implementation of a network server. The disk drive system 104 may also be configured with one or more partitions. A partition is a portion of the physical disk(s) that the operating system 108 treats as a separate drive. DOS supports multiple partitions on a disk drive system, but only one such partition can be the primary-bootable partition. Typically, network servers are configured so as to be bootable from the server rather than from a floppy disk. In these systems, the boot disk, which is disk 202 in the illustrated embodiment, has a DOS partition 205 along with a partition 206 for the network operating system (NOS). Non-boot disks may be configured with additional partitions.

The disk drive system 104 is logically divided into one or more volumes 207, each created and controlled by the network operating system 108. The disk drive system 104 may be configured to include one or more volumes 207 on a single physical disk or a volume may span more than one disk in the disk drive system 104. In the illustrated embodiment, the volume 207 spans from disk 202 to disk 204 and beyond.

A volume may be logically divided into one or more independently-accessible segments, each containing a plurality of volume blocks. In the exemplary embodiment shown in FIG. 2A, the volume 207 contains a single volume segment 210 which contains numerous volume blocks 212. Each of the volume blocks 212 is uniquely numbered and referenced in the volume 207.

At least one volume block 212 is allocated for each file stored in the disk drive system 104. Files that do not completely fit into a volume block 212 will leave unused space in that volume block. As a result, larger volume block sizes prevent the complete utilization of the storage space on the disks 202 and 204. In addition, since each file requires at least one volume block 212, the most files that can be stored on the volume 207 is determined by the number of available volume blocks 212. As will be described in detail below, the operating system 108 recognizes suballocated volume blocks. Suballocation enables more than one file to be stored in a volume block 212. In such systems, the operating system 108 designates certain volume blocks 212 as suballocation reserved blocks (SRB), each of which are associated with a specific narrow range of file sizes and ending data fragments.

Each volume, such as volume 207, contains a dedicated area, typically at the beginning of the volume 207, for storing volume definition tables 208. The volume definition tables 208 contain volume information such as the name of the volume, the current size of the volume blocks 212, the partition sizes, the location of a file allocation table (FAT) and directory entry table (DET), both of which are well-known and described in detail below. In addition, the disk drive system 104 includes a dedicated area for storing partition information 203. The partition information 203 may contain such information as the number and location of partitions and other related information. The volume definition tables 208 and partition information 203 are accessed by the volume block resizer 102 of the present invention as described below.

FIG. 2B is a diagram illustrating the file allocation and directory entry tables stored in the volume definition tables 208. The file allocation table 250 is a table maintained by the operating system 108 to store information about the files in volume 207. The file allocation table 250 records which volume blocks 212 belong to each file stored in the disk drive system 104. The file allocation table 250 includes an enumeration of the volume blocks that make up each file, referred to as the FAT chain 254. The FAT chain 254 contains a series of one or more unique volume block reference numerals. These volume blocks contain the contents of the file identified in the directory entry table 256. For example, the file fname1.ext is a file having data in the volume blocks 13, 26, 79, 380 and 475. This sequence of volume block numbers is referred to as a FAT chain 254. It should be noted that a portion of a file that is stored in a volume block is sometimes referred to as a file block. In addition, volume blocks are commonly referred to in the art in the art as FAT blocks.

The directory entry table (DET) 256 keeps track of all of the FAT chains 254 for the files on a volume, and records information about each file, such as file attributes. The directory entry table 256 includes a directory entry 258 which identifies the name of each directory entry in the volume 207. As is known in the art, a directory entry may be a file name or a directory name. The directory entry table 256 also contains a file owner 260 for identifying the directory in which the associated directory entry 258 is included. In addition, the directory entry table 256 includes a file size 262 and FAT chain pointer 264. The FAT chain pointer 264 is a pointer to the location in the FAT table 250 that contains the first volume block 212 in the FAT chain 254 associated with that file. Thus, the file allocation table 250 is accessible through the directory entry table 256. The directory entry table 256 contains other data 266 not pertinent to the present invention, such as that typically utilized by DOS. For example, other data 266 may include the creation date, archival information, access rights, and other information associated with the directory entry 258.

Figure 3:
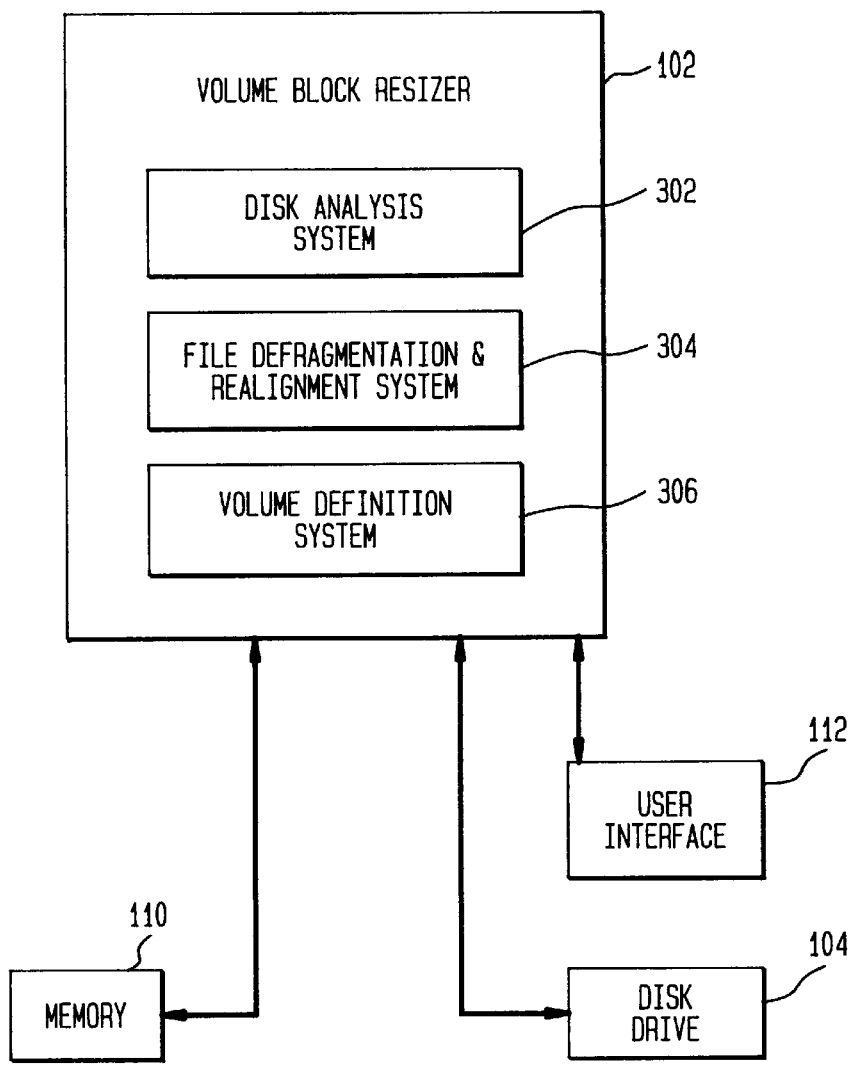
FIG. 3 is a high-level functional block diagram of a preferred embodiment of the automatic volume block resizer of the present invention illustrated in FIG. 1.

FIG. 3 is a functional block diagram of one embodiment of the volume block resizer 102 of the present invention. As shown schematically in FIG. 3, the volume block resizer 102 communicates with the user interface 112, receiving, for example, invocation commands, an indication of the volume on which to perform the automatic volume block resizing processes of the present invention (that is, a targeted volume), and, in a preferred embodiment, a user-selected new volume block size. The volume block resizer 102 operates on disk drive system 104 using local memory 110 to temporarily store data during its processing.

The volume block resizer 102 of the present invention primarily includes a disk analysis subsystem 302 for obtaining current information regarding a targeted volume, such as volume 207, from the disk drive system 104. The disk analysis subsystem 302 accesses partition information 203 and volume definition tables 208 to obtain such information. The disk analysis subsystem 302 creates various tables and bit-maps to facilitate other subsystem processes of the volume block resizer 102 to resize a targeted volume 207 from an original volume block size to a new volume block size.

The volume block resizer 102 also includes a file defragmentation and realignment subsystem 304 for defragmenting files on a target volume and realigning those files on new volume block boundaries. The file defragmentation and realignment subsystem 304 rearranges original volume blocks 212 as needed to create the necessary disk space to store the defragmented files on new volume block boundaries. Preferably, the file defragmentation and realignment subsystem 304 selects new volume block boundaries that require the fewest number of original volume blocks to be moved, although other selection criteria may be used. In addition, subsystem 304 preferably does not move files which currently begin on a new volume block boundary and are of a size equal to or greater than the size of the new volume block. The file defragmentation and realignment process is performed on the original volume blocks and the original file allocation table 250 and directory entry table 256 are maintained throughout the process. This provides a recovery mechanism should the subsystem not be able to complete resizing the target volume.

The automatic volume block resizer 102 of the present invention also includes a volume definition subsystem 306 that redefines the target volume 207 by updating the volume definition tables 208 and partition information 203 with new file allocation and directory entry tables that reflect the resized volume 207. These functions are preferably performed after the files have been defragmented and realigned to insure a reliable FAT and DET are always available regardless of whether the resizing of the volume is completed.

Figure 4:
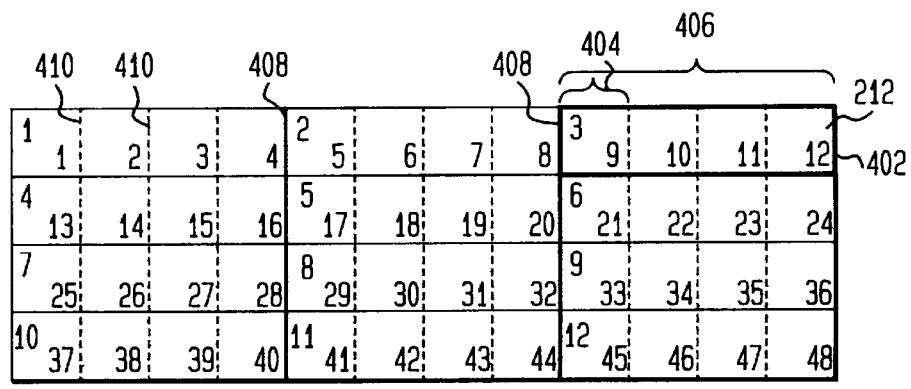
FIG. 4 is a schematic block diagram of a portion of the volume illustrated in FIG. 2A illustrating the old and new volume block sizes created in accordance with the present invention.

A schematic block diagram of a portion of the volume 207 showing an exemplary original volume and new volume block size is illustrated in FIG. 4. The old volume block boundaries are shown in FIG. 4 as dashed lines to clarify the relationship between the new volume blocks 402 and the old volume blocks 212. In FIG. 4, the original volume blocks 212 have volume block reference numerals which are located in the bottom right-hand corner of each of the original volume blocks 212. As shown in FIG. 4, there are 48 original volume blocks 212 in the portion 400 of the volume 207.

In a preferred embodiment of the present invention, the disk analysis subsystem 302 provides the user with the capability of indicating a desired new volume block size. In one aspect of this embodiment, the system administrator may resize a targeted volume 207 to have a volume block size of 4, 8, 16, 32 or 64 kilobytes. In the illustrative embodiment described herein, the original volume block size is 4 kilobytes.

The present invention utilizes the ratio of the original volume block size 406 and the new volume block size 404 to determine the number of original volume blocks 212 to manipulate during the defragmenting and realignment process. For example, using a new volume block size 406 of 16 kilobytes, there are four original volume blocks 212 of 4 kilobytes in each of the new volume blocks 402. Accordingly, there is a 4-to-1 volume block ratio. In other words, a new volume block 402 has a block size 406 of 16 kilobytes, and includes four original blocks 212 each having a volume block size 404 of 4 kilobytes. Thus, each new volume block 402, which is uniquely referenced by the reference numerals placed in the upper left-hand corner of the new volume blocks 402, defined on a new volume block boundary 408. As shown in FIG. 4, the volume portion 400 contains a total of twelve new volume blocks 402.

Figure 5:
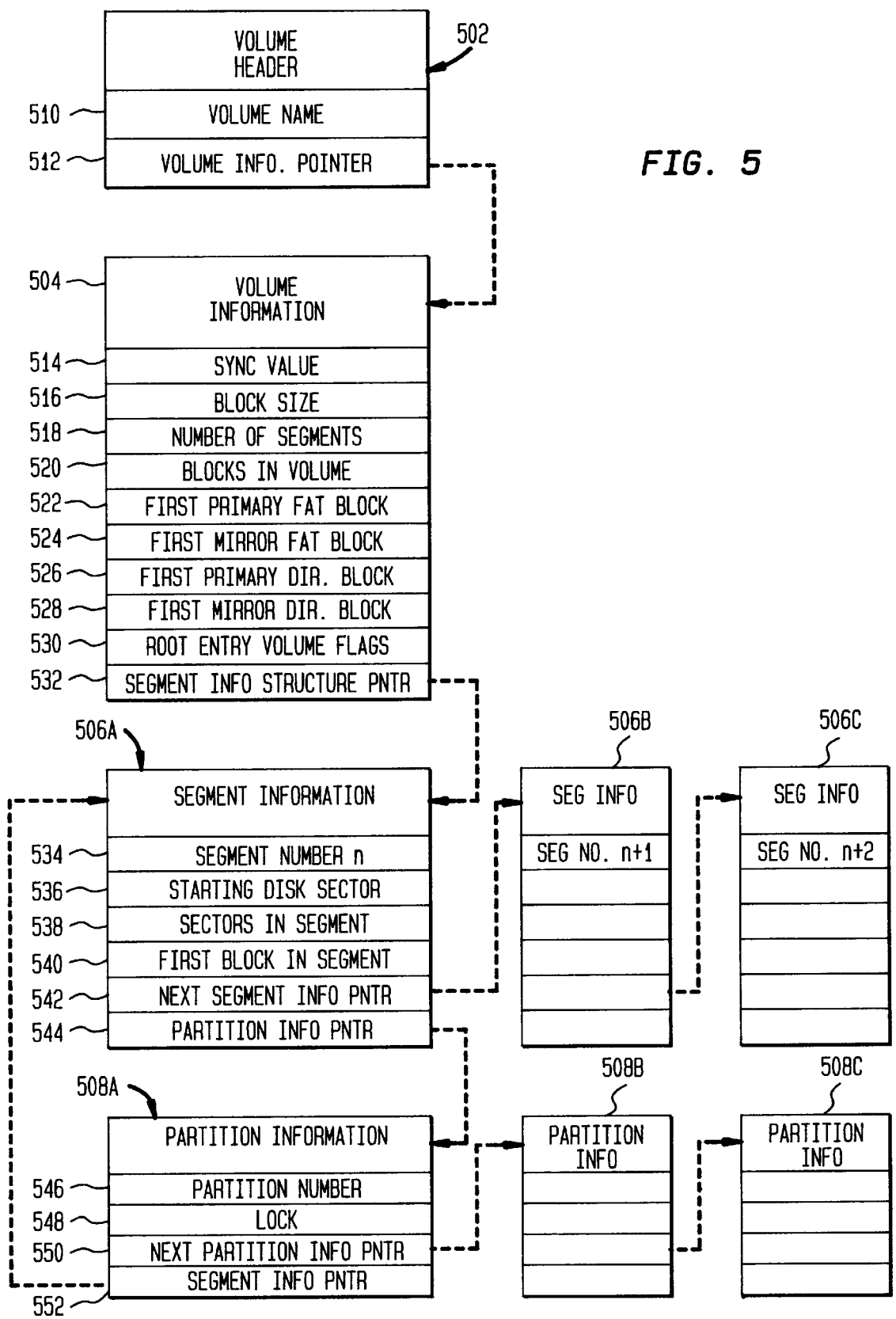
FIG. 5 is a diagram of the volume information structures or tables created by the disk analysis subsystem of the automatic block resizer of the present invention.

The disk analysis subsystem 302 is described in detail below with reference to the tables and bit-maps the subsystem creates, as illustrated in FIGS. 5–61, and the flow chart illustrated in FIGS. 9A and 9B. As noted, the disk analysis subsystem 302 receives an indication of the targeted volume 207 from the system administrator via the user interface 112. Also, the disk analysis subsystem 302 receives the new volume block size 406 for the resized volume 207. As noted, this block size is preferably provided by the system administrator via the user interface 112. With this information, the disk analysis subsystem 302 creates various tables and bit-maps in memory 110. The subsystem 302 performs various calculations discussed below, the results of which are also stored in the tables and bit-maps for use by the subsystems 304 and 306 described below. Also, the disk analysis subsystem 302 determines whether the operating system 108 is currently configured to recognize suballocation. If not, the disk analysis subsystem 302 implements suballocation and the appropriate entries are made to the directory entry table 256 to reference the suballocated volume blocks.

The disk analysis subsystem 302 creates volume status tables illustrated in FIG. 5, a FAT-to-DET table 602 illustrated in FIG. 6A, a directory block table 604 illustrated in FIG. 6B, and various bit-maps illustrated in FIGS. 6C–6I. As noted, the disk analysis subsystem 302 inserts various information into these tables and bit-maps that is either obtained from the disk drive system 104 or the result of calculations performed by the subsystem 302.

Referring to FIG. 5, the volume status tables created by the disk analysis subsystem 302 in accordance with the present invention are described below. In one embodiment, there are at least four linked tables containing the volume status information. These linked tables include a volume header table 502, volume information tables 504, segment information tables 506, and partition information table 508. The volume header table 502 contains a volume name 510 of the targeted volume 207 and a pointer 512 to the volume information table 504 associated with the volume indicated at volume name 510. The volume information table 504 includes a sync value 514 containing the number of times the volume definition has been modified. A block size 516 indicates the size of the current volume blocks 212. Field 518 includes the number of segments that are included in the target volume 207. As noted, in the exemplary embodiment, the volume 207 contains a single segment.

The blocks in volume field 520 includes the number of volume blocks 212 that are in the targeted volume 207. The fields 522 and 524 contain the first primary FAT block location indicating where the file allocation table begins. Likewise, field 524 illustrates the same for the mirrored FAT, if one exists. In like manner, fields 526 and 528 contain the first primary DET block and the first mirrored DET block. A root entry volume flag 530 indicates if suballocation is on or off. As noted, the disk analysis subsystem 302 utilizes this information to determine whether or not it should implement suballocation. Finally, the volume information table 504 includes a segment information structure pointer 532 which points to a first segment information table 506 for the targeted volume 207.

As shown in FIG. 5, there may be more than one segment information table 506. As such, the segment information table pointer 532 points to the first segment information table 506A if more than one such table exists. Each segment information table 506 contains a segment number n 534 which identifies which segment in the target volume is associated with this segment information table 506. A starting disk sector 536 identifies the first physical sector on the physical disk at which the associated segment begins. The number of sectors in the segment is provided in field 538 while the first volume block of the segment is provided in field 540. Field 542 contains a next segment information pointer to link the segment information table 506A with a next successive segment information table 506B. The segment information table 506B would then be associated with a segment number n+n1. The segment information table 506A also includes a partition information pointer 544 which points to a partition information table 508.

The partition information table 508 includes a partition number 546 indicating which partition includes in the segment associated with the segment information table 506 which links this particular partition information table 508. A lock 548 in the partition information table 508 indicates whether the operating system or users have access to the partition. The partition information table 508A also includes a pointer 550 to the next partition information table 508B. Likewise, a segment information table pointer 552 is provided to link the partition information table 508A with the segment information table 506A.

As noted, the disk analysis subsystem 302 creates a FAT-to-DET table 602 and a directory block table 604. These tables are illustrated in FIGS. 6A and 6B, respectively. The FAT-to-DET table 602 identifies the directory entry owner of each of the FAT blocks (i.e., volume blocks) on the target volume 207. Since volume blocks are moved during the defragmentation and realignment processes performed in accordance with the present invention, the FAT-to-DET table 602 is continually updated to identify which directory entry owns the data in a particular FAT block. The FAT-to-DET table 602 contains a FAT block (volume block) column 606 sequentially listing all of the volume blocks. The FAT-to-DET table 602 includes a directory entry pointer 608 that points back to the directory entry (file or directory) that owns the data in the associated FAT block 606.

The directory block table 604 contains a list of volume blocks that contain the directory entry table 256. These volume blocks, referred to as directory blocks, are maintained in the directory block table 604 to enable the volume block resizer of the present invention to keep track of the directory entry table 256 on the targeted volume 207. As will be described in detail below, the directory block table 604 is used by the volume block resizer to quickly access the directory entry table.

The disk analysis subsystem 302 creates a number of bit-maps to maintain control over the location and status of the volume blocks 212 and 402 and directory entries 258 on the target volume 207. The use of the bit-maps is preferable in that access to the information during the defragmentation and realignment processes described below may be performed quickly through well-known bit-map techniques. FIG. 6C illustrates a bit-map table 652 for tracking the availability of the original volume blocks 212. In the bit-map table 652, a bit associated with each of the original volume blocks 212 is set true to indicate that the volume block is currently in use.

A new volume FAT bit-map table 654 is illustrated in FIG. 6D. This bit-map table is maintained throughout the volume resizing process to indicate whether the new volume blocks 402 are currently in use; that is, whether the volume blocks are available or whether they currently contain data. It can be seen from FIGS. 6C and 6D then that if any of the original volume blocks 212 which are associated with a new volume block 402 are unavailable, then the new volume FAT bit-map table 654 will indicate the same status for the associated new volume block 402.

FIGS. 6E and 6F are bit-maps created by the disk analysis subsystem 302 to indicate the size of each of the directory entries in the target volume 207. In the bit-map tables 656 and 658, one bit is associated with each of the directory entries. In the directory entry large file bit-map 656, the associated bit is set true to indicate that the directory entry is a file that satisfies the file size requirement. The file size requirement is determined by the selected new volume block size. A "large" file is a file that has a size which is at least the size 406 of a single new volume block 402. On the other hand, the directory entry small file bit-map 658 has a bit associated with each of the directory entries indicating whether the associated directory entry is smaller than the new volume block size 406. These two bit-maps are scanned by the file defragmentation and realignment subsystem 304 to determine the size of the files as they are realigned. As noted, the use of such bit-maps is advantageous in that the directory entry table 256 and file allocation table 250 do not have to constantly be re-read to obtain this information. Rather, scanning the bit-maps is a faster and more efficient way to obtain information.

FIGS. 6G–6I illustrate bit-maps for some of the suballocation reserve blocks maintained in the target volume 207.

As noted, suballocation enables more than one file to be stored in a volume block. These volume blocks, referred to as suballocation reserved blocks (SRBs), are each associated with a specific narrow range of file sizes or ending data fragments. Ending data fragments are those portions of a file that are smaller than the volume block size. In a preferred embodiment of the present invention, the suballocation reserve blocks are based on multiples of 512 bytes. Accordingly, there are suballocation reserve blocks that store files and ending data fragments that are from 1- to 512 bytes, 513–1024 bytes, 1025–1536 bytes, etc. In this embodiment, files that are within 511 bytes of the volume block size are not suballocated. In the exemplary embodiment discussed above wherein the original volume block size is 4 kilobytes, the suballocation reserve blocks can store up to eight 512 byte files or ending data fragments (8×512= 4096). Accordingly, the suballocation bit-map table 660 associated with such suballocation reserve blocks have eight bits for each of the suballocation reserve blocks, one associated with each of the 512 byte sub-blocks. Referring to FIG. 6G, the first suballocation reserve block contains eight sub-blocks of which the second, sixth and eighth contain files or ending data fragments. A similar arrangement is shown in FIG. 6H for suballocation reserve blocks dedicated to storing files and ending data fragments having 513–1024 bytes. As shown, there are four sub-blocks (4×1024=4096). Also, the suballocation bit-map table 664 illustrated in FIG. 6I provides a bit mask indicating whether the sub-block which is dedicated to storing 1025–1536 bytes are in use. As shown in FIG. 6I, the suballocation blocks are not restricted to the volume block boundaries but instead span the suballocation reserve blocks as necessary to store the files and ending data fragments. Other suballocation bit-map tables of other size sub-blocks are not shown.

The volume block resizer of the present invention creates a new file allocation table 702 illustrated in FIG. 7. The new file allocation table 702 has essentially the same arrangement as the original file allocation table 250. The new file allocation table 702 is maintained in memory 110 during the volume block resizing process of the present invention. This, coupled with the file defragmentation and realignment processes described below performed on the original volume block size 404, enables the present invention to insure that the targeted volume 207 is not exposed to risk should the computer system 100 fail during the volume block resizing process.

The new file allocation table 702 records which new volume blocks 706 belong to each file stored in the disk drive system 104. The new file allocation table 702 includes the new FAT chain 706 for each of the files in the targeted volume 207. The FAT chain 706 contains a series of one or more new volume block reference numerals containing the associated file. As shown in FIG. 7, due to the volume block resizer of the present invention, the FAT chain 706 contains sequentially numbered volume blocks.

As noted, the file defragmentation and realignment subsystem 304 defragments the files in the target volume 207 and aligns the defragmented files on new volume block boundaries 408. The file defragmentation and realignment subsystem 304 uses the tables and bit-maps described above that were created by the disk analysis subsystem 302. Preferably, files having a size which is equal to or greater than the new volume block size 406 are defragmented and realigned onto new volume block boundaries 408 during the resizing process described below. The processing of larger files before smaller files enables the larger files to be stored in complete new volume blocks thereby insuring that all of the available storage space in the new volume block is utilized. Preferably, system files such as the file allocation table 250 and directory entry table 256 are defragmented and aligned so that they are contiguous on the new volume block boundaries 408. Advantageously, system files will then not have to be moved again throughout the resizing process. If they are left fragmented in various locations on the targeted volume 207, then, during the subsequent defragmentation processes, the system files may have to be repeatedly moved to make disk space available to accommodate the new volume blocks.

It is noted that during the defragmentation and realignment process the original file allocation table 250 is continually maintained. This insures the ability to recover from a power failure or other occurrence which adversely interferes with the completion of the volume resizing process.

The volume definition subsystem 306 redefines the targeted volume 207 by updating information in the partition information 203 and volume definition tables 208. Once the files and the target volume 207 have been defragmented and aligned on new volume block boundaries 408, the volume definition subsystem 306 updates the disk drive system 104. Subsystem 304 writes the new file allocation table 702 and directory entry table 202 onto the target volume. The volume definition tables 208 and partition information 203 are updated to reflect tables in the volume block size.

FIG. 8 is a high level flow chart of the processes performed by the volume block resizer 102 of the present invention. The automatic volume block resizing process 800 begins at start block 802, typically through the invocation of a system administrator through user interface 112. Preferably, the volume block resizer 102 is executed on demand and receives a targeted volume 207 from the system administrator via the user interface 112.

At block 804 the volume block resizer 102 interrogates and analyzes the disk drive system 104. In the embodiment wherein the system administrator may select from a number of available new volume block sizes, the volume block resizer 102 also provides the system administrator with a selection list from which to select the desired new volume block size. The volume block resizer 102 identifies the volumes 207 on the disk drive system 104, the current volume block size 404, the partition sizes and the location of the file allocation table 250 and directory entry table 256. The volume block resizer 102 also obtains volume-specific information such as whether suballocation is activated. The process of accessing information on the disk drive system 104 is considered to be well-known in the art.

The volume block resizer 102 collects the above information and presents a selection list from which to select the target volume, receiving the selected targeted volume block. Also, the volume block resizer 102 determines the block ratio used in accordance with the present invention at block 804. Finally, the volume block resizer 102 builds various tables and bitmaps as noted above which are used during the file defragmentation and realignment process.

At block 806, the volume block resizer 102 realigns and defragments system files and, subsequently, data files. Once the data files are realigned onto new volume block boundaries, the targeted volume 207 is resized at block 808. Here, ending data fragments (the remaining portions of the larger files that extend beyond a new volume block) and small files are suballocated. This insures the optimal use of the available space on the target volume 207. Then, configuration and status information stored on the disk drive system 104 is updated to reflect the new volume block size 406. The automatic volume block resizing process then completes at stop block 810.

Figure 9A:
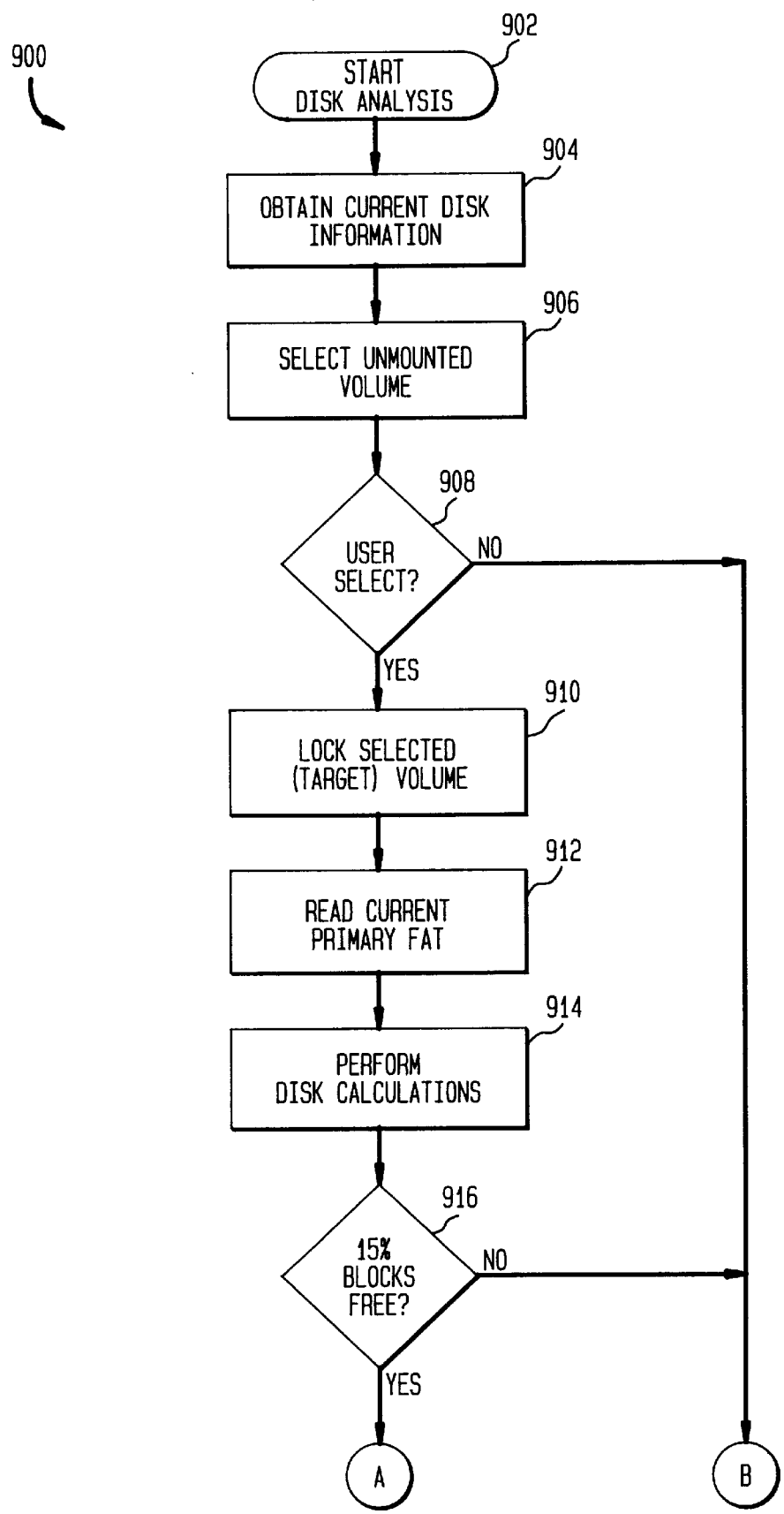
FIGS. 9A-9B are a flow chart illustrating a preferred embodiment of the disk analysis process performed in accordance with the present invention.
Figure 9B:
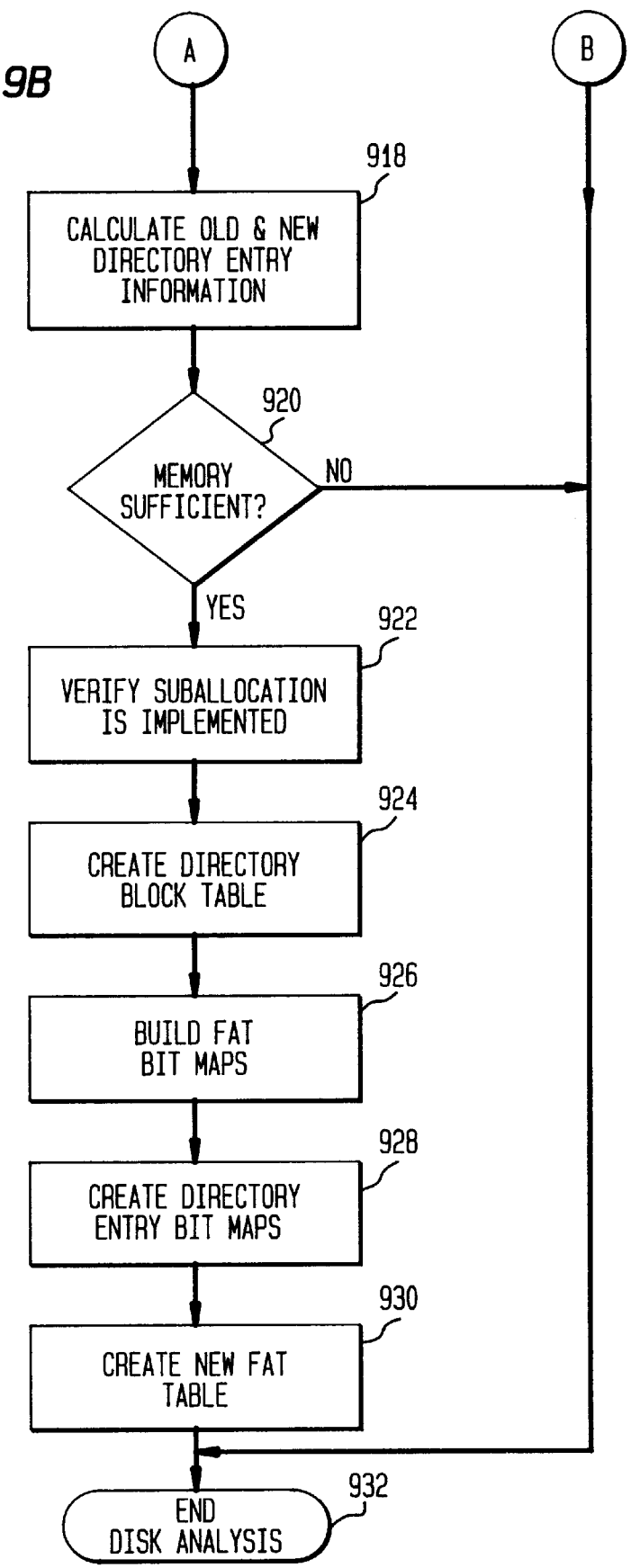

FIGS. 9A and 9B are a flow chart of one embodiment of the disk analysis process 900 of the present invention. The disk analysis process 900 of the present invention begins at start block 902 wherein the user or system administrator invokes the volume block resizer 102 to resize a targeted volume 207 from an original volume block size 404 to a new volume block size 406. At block 904, the current disk and volume information stored in partition information 203 and volume definition tables 208 for all of the volumes in the disk drive system 104 is obtained. This information includes the name of the volumes, the original volume block size 404, partition size, the location of the FAT table 250 and directory entry table 256, as well as other information utilized during the defragmentation and realignment process of the present invention. This information is preferably placed in local memory during the performance of the disk analysis process 900.

Particularly, this information is stored in the volume tables 502-508 described above.

At step 906, an unmounted volume selected by the user is received. As defined herein, a "mounted" volume is a volume to which the user has access. An "unmounted" volume, on the other hand, refers to a volume that is off-line, or not accessible to the user. At block 906, the unmounted volumes are identified and presented to the administrator through user interface 112 to enable the administrator to select an unmounted volume. In the present discussion, the selected unmounted volume is the target volume 207. The automatic volume block resizing process 800 of the present invention can only be performed on unmounted volumes since mounted volumes may be manipulated by the user, thereby interfering with the resizing process.

At block 908, it is determined whether the user has selected an unmounted volume. If not, processing advances to end block 932 where processing ceases. Alternatively, if it is determined at block 908 that the user selected an unmounted volume at block 906, then processing continues at block 910 whereat the selected or target volume 207 is locked. Here, the is volume is locked to prevent the computer system 100 from accessing the targeted volume 207 so that no other system processes can work on the volume during the volume block resizing process 800 of the present invention.

Once an unmounted target volume 207 is locked, the original FAT table 250 is read into memory 110. In embodiments wherein the FAT table 250 is duplicated or mirrored, the primary FAT table is preferably read into memory. At block 914, various disk and volume calculations are performed based upon the information obtained from the partition information 203 and volume definition tables 208 on the disk drive system 104. This information includes, for example, the number of volume blocks in the targeted volume 207 stored in field 520 of the volume information table 504 and the size 404 of the original volume blocks 212, which is stored in the field 516 in the volume information table 504. In addition, the sectors per block, the number of FAT blocks, the FAT entries per block, the number of FAT entries, the block ratio, and the number of free blocks are calculated.

Once these various calculations are performed, at block 916 it is determined whether a sufficient amount of the volume blocks 212 are free (that is, contain no data) so that the volume block resizing process 800 of the present invention may be successfully performed. This determination is made by scanning the FAT chain 254 in the original FAT table 250 to summarize all of the volume or FAT blocks that are used in the targeted volume 207. In a preferred embodiment, this portion of volume blocks is 15 percent of the total number of volume blocks 212 in the volume 207. Thus, if less than 15 percent of the original volume blocks 212 are not free in the targeted volume 207, then processing continues at end disk analysis block 932 whereat processing ceases. Otherwise, if there is sufficient room to manipulate the volume blocks in the targeted volume 207, then processing continues at block 918 shown in FIG. 9B.

At block 918, the old and new directory entry information is calculated. As noted, a directory block is a volume block that contains directory information. To move and access the directory entry table 256, the number of volume blocks 212 that the directory entry table 256 consumes is preferably known. In the illustrative embodiment, each directory entry 258 in the directory entry table 256 is allocated 128 bytes. Therefore, to read a directory entry 258 in the directory entry table 256, the volume block size 404 may be simply divided by 128 bytes to determine the number of directory entries per volume block 212. Given this number, and the number of directory entries in the directory entry table 256, a directory entry 258 in the directory entry table 256 can be accessed by advancing to the volume block 212 which contains the desired directory entry 258. Thus, at block 918, the number of directory blocks 610, the number of directory entries 258, and the number of directory entries per block are determined for use by the file defragmentation and realignment subsystem 304.

At block 920, the memory 110 is scanned to verify that a sufficient amount of memory locations are available to perform the volume block resizing process 800 of the present invention. A significant amount of memory space may be needed since the entire FAT table 250 is read into memory 110 along with other information such as the volume status tables 502–508. If there is insufficient memory, then processing advances to end disk analysis process block 932 whereat processing ceases. If there is sufficient memory, then processing continues at block 922 wherein suballocation is implemented. As noted, suballocation must be implemented in order to have access to all of the disk system 104 during the volume block resizing process 800 of the present invention. This information is typically located in the root directory and provided a directory entry number of 0 by the present invention. If suballocation was not implemented in the operating system 108 prior to beginning the volume block resizing process 800, then suballocation is implemented at this time.

Once it is determined that the computer system 100 can support the processes of the present invention, then the disk analysis process 900 establishes the various tables and bit-maps described above. At block 924, the directory block table 604 is created. Table 604 contains pointers to the directory blocks and is used to keep track of the directory entry table 256 on the targeted volume 207.

At block 926, the FAT bit-maps 652 and 654 are created. The original volume FAT bit-map table is created by scanning the file allocation table 250 and setting the bit-map appropriately. The new volume bit-map table 654 is likewise created in the same manner given the relationship between the original volume blocks 212 and the new volume blocks 402 described above with reference to FIG. 4. The directory entry bit-maps 656 and 658 are then created at block 928. As noted, the directory entry large file bit-map table 656 and a directory entry small file bit-map table 658, each indicate whether the associated directory entry is greater and lesser than the new volume block size 406, respectively.

Finally, at block 930, the new file allocation table 702 is created. This file allocation table is maintained with all the files on the target volume 207 organized in accordance with the new volume block size boundaries 408. Once the tables and bit-maps have been created, the disk analysis process 900 of the present invention ceases at end block 932.

FIG. 10 is a high level flow chart of the defragmentation and alignment process 1000 of the present invention. This process is performed after the disk analysis process 900 is completed as it utilizes the various tables and bit-maps established during that process. The defragmentation and alignment process 1000 begins at start block 1002 and will only be written to the disk drive system 104 at the completion of the file block resizing process 800. At block 1004, the volume management files are defragmented and aligned on new volume block boundaries 408. Some of these files have been retrieved during the disk analysis process 900 and stored in local memory 110. This information is now stored on the target volume 207 in a contiguous form on the new volume block boundaries 408. The advantage of making these files contiguous on the new block boundaries 408 is that these files will not have to be moved again throughout the resizing process 800. If they are left fragmented in the various volume blocks 212, they will likely have to be moved repeatedly throughout the resizing process 1000. Once these critical files have been defragmented and realigned on the new volume block boundaries 408, processing continues at block 1006.

At block 1005 sparse files are realigned. A sparse file for which the volume blocks in the FAT chain 254 are not sequential but instead leave gaps. The intervening volume blocks are zero-filled blocks. As a result, the logical representation of sparse files may be substantially larger than the physical length of the file. To support such arrangements, a sufficient number of zero-filled blocks are interposed between the new volume blocks during the resizing process so that the logical representation of the resized file is the same as the original.

The defragmentation and realignment process 1000 of the present invention addresses "large" files; that is, files that are equal to or greater than the new volume block size 406. Since, as will be discussed below, suballocation is utilized to place smaller files and ending data fragments in suballocation reserved blocks, the selection of large files enables the present invention to move only those files which need to be moved to result in a volume having the new volume block size. This is just one of the various optimizations implemented in the present invention. This process is described in detail below with reference to FIGS. 11A and 11 B.

Once the critical files and large files have been defragmented and realigned on the new volume block boundaries 408, the smaller files are preferably moved to the rear of the target volume 207 to free up as much contiguous space as possible. Freeing up this space will aid in the suballocation of small files and ending data fragments. As will be explained in detail below, additional new blocks are allocated during the defragmentation and alignment process 1000. Thus, the functions performed at block 1008 may be performed at other times during the defragmentation and alignment process 1000.

The defragmentation and realignment process 1000 of the present invention ceases at end block 1010. It should be noted that the defragmentation and realignment process 1000 of the present invention is performed while maintaining the original FAT table 250 and old volume block size 404. This approach provides a recovery mechanism should the volume block resizing process 800 not complete.

Figure 11A:
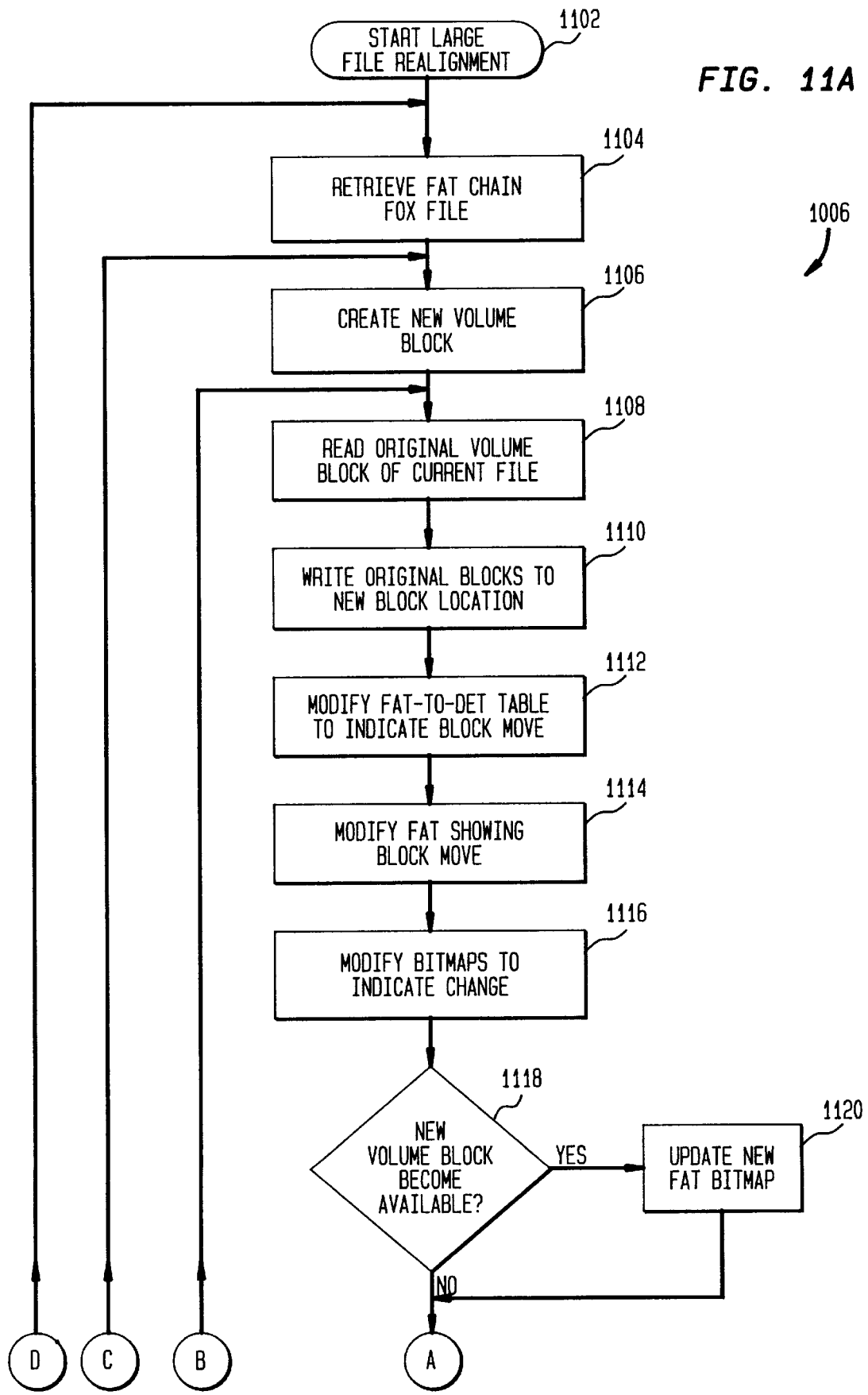
FIGS. 11A-11B are a flow chart illustrating a preferred embodiment of the process performed to realign and defragment "large" files in accordance with the present invention.
Figure 11B:
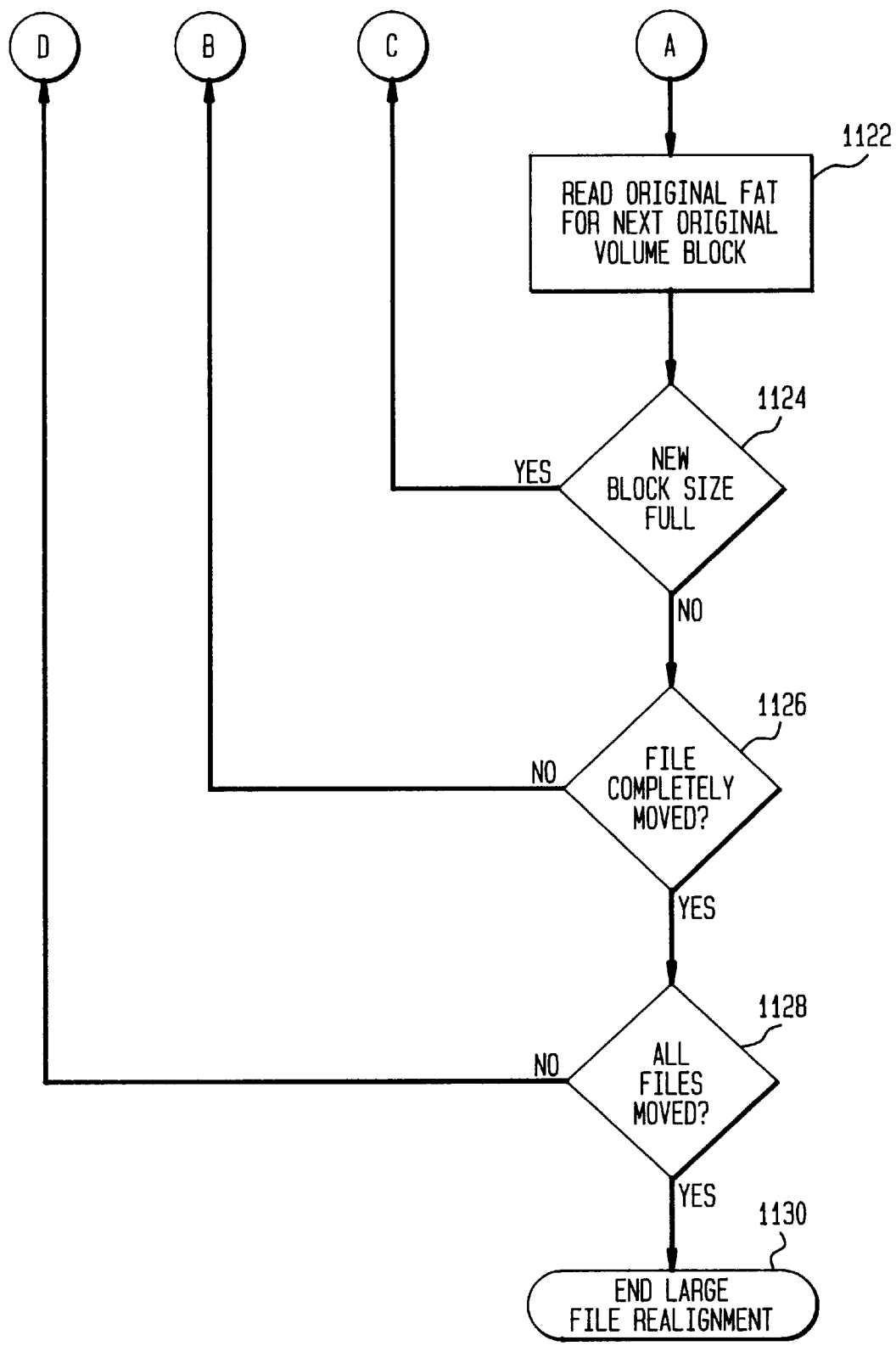

A flow chart of the processes performed at block 1006 is illustrated in FIGS. 11A and 11B. Here, the files which have a size which is greater than the new volume block size 406 are defragmented and realigned on the new volume block boundaries 408. At block 1104, the FAT chain 254 is retrieved from the original file allocation table 250 for a current file to be realigned and defragmented. The file is identified as being a large file in the directory entry large file bit-map table 656.

At block 1106, a new volume block 402 is created to place the current file to be realigned and defragmented. This process is described in detail below with reference to FIG. 12. Once a new volume block 402 is obtained, the original volume block 212 of the file to be moved, as indicated by the FAT chain 254, is read at block 1108. The original volume block 212 containing a portion of the file is written to a new volume block location at block 1110. This process is performed on the original volume block size 404 to maintain the original configuration of the disk drive system 104 until the resizing of the targeted volume 207 is completed.

Once the original volume block 212 has been moved, the various tables and bit-maps are updated to indicate the block move. At block 1112, the FAT-to-DET table 602 is modified. At block 1114, the file allocation table 250 and the new file allocation table 702 are updated to indicate this availability. At block 1116, the bit-maps 652-658 are updated. If it is determined at block 118 that the reading and writing of the original volume block 212 at blocks 1108 and 1110 result in the availability of a new volume block 402, then processing continues at block 1120 where the new FAT bit-map 702 is updated. If a new volume block did not become available, then processing continues at block 1122.

At block 1122, the original FAT table 250 is read for the next original volume block 212 in the FAT chain for the current file. If the movement of the previous original volume block 212 for the file completely filled a new volume block 402, as determined at block 1124, then processing continues at block 1106 to obtain another new volume block 402. Otherwise, at block 1126 it is determined whether the file has been completely moved. If not, then processing continues at block 1108 wherein the above process is repeated to move the original volume block to a new block location. However, if at block 1126 it is determined that the file has been completely moved, then processing continues at block 1128 wherein it is determined whether all of the large files in the target volume 207 have been defragmented and realigned. If not, then processing continues at block 1104 wherein the FAT chain 254 for the next file is retrieved from the original file allocation table 250. Once all the files have been moved, then processing ceases at block 1130.

Figure 12A:
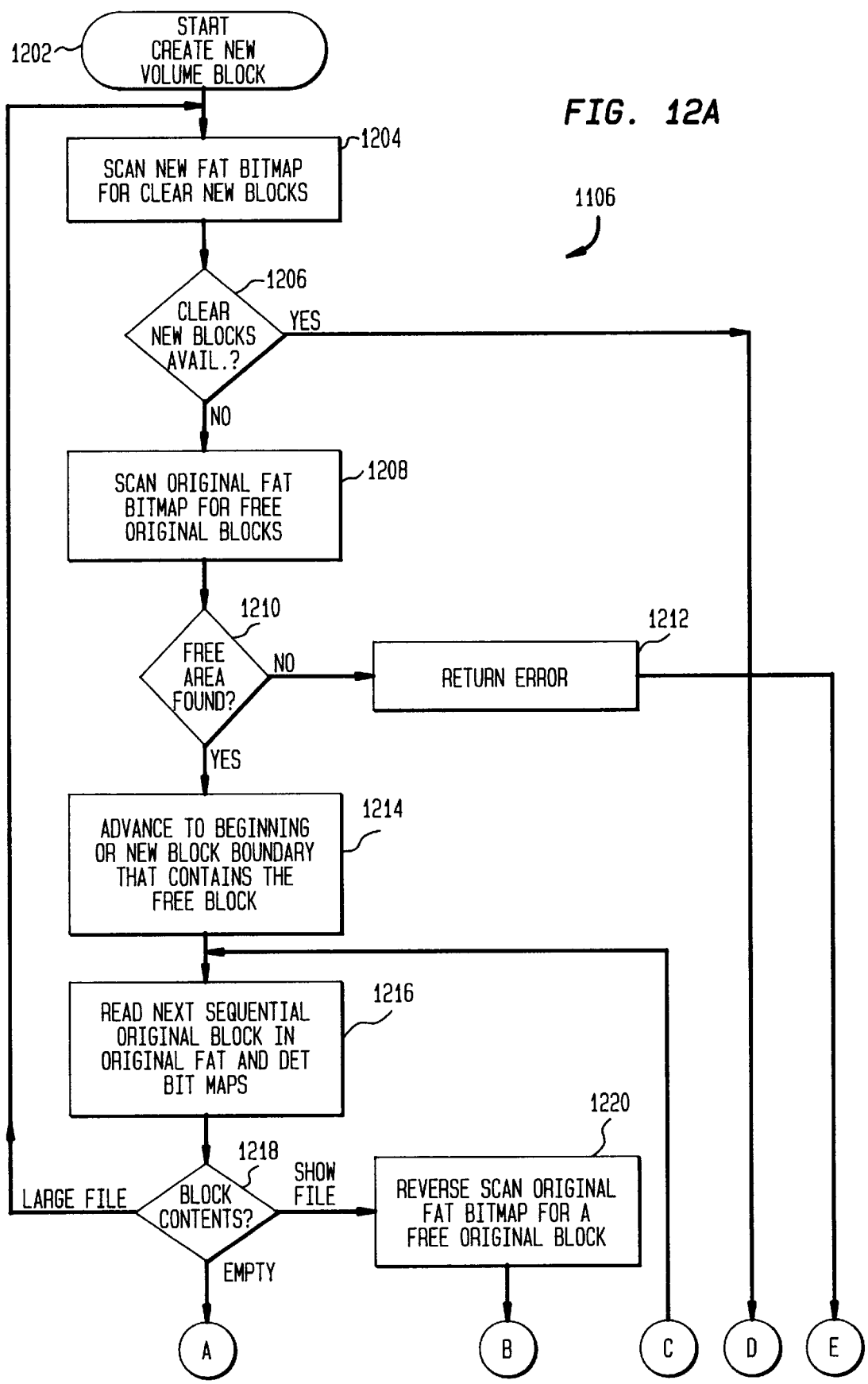
FIGS. 12A-12B are a flow chart of a preferred embodiment of a process to create new volume blocks of available disk space performed in accordance with the present invention.
Figure 12B:
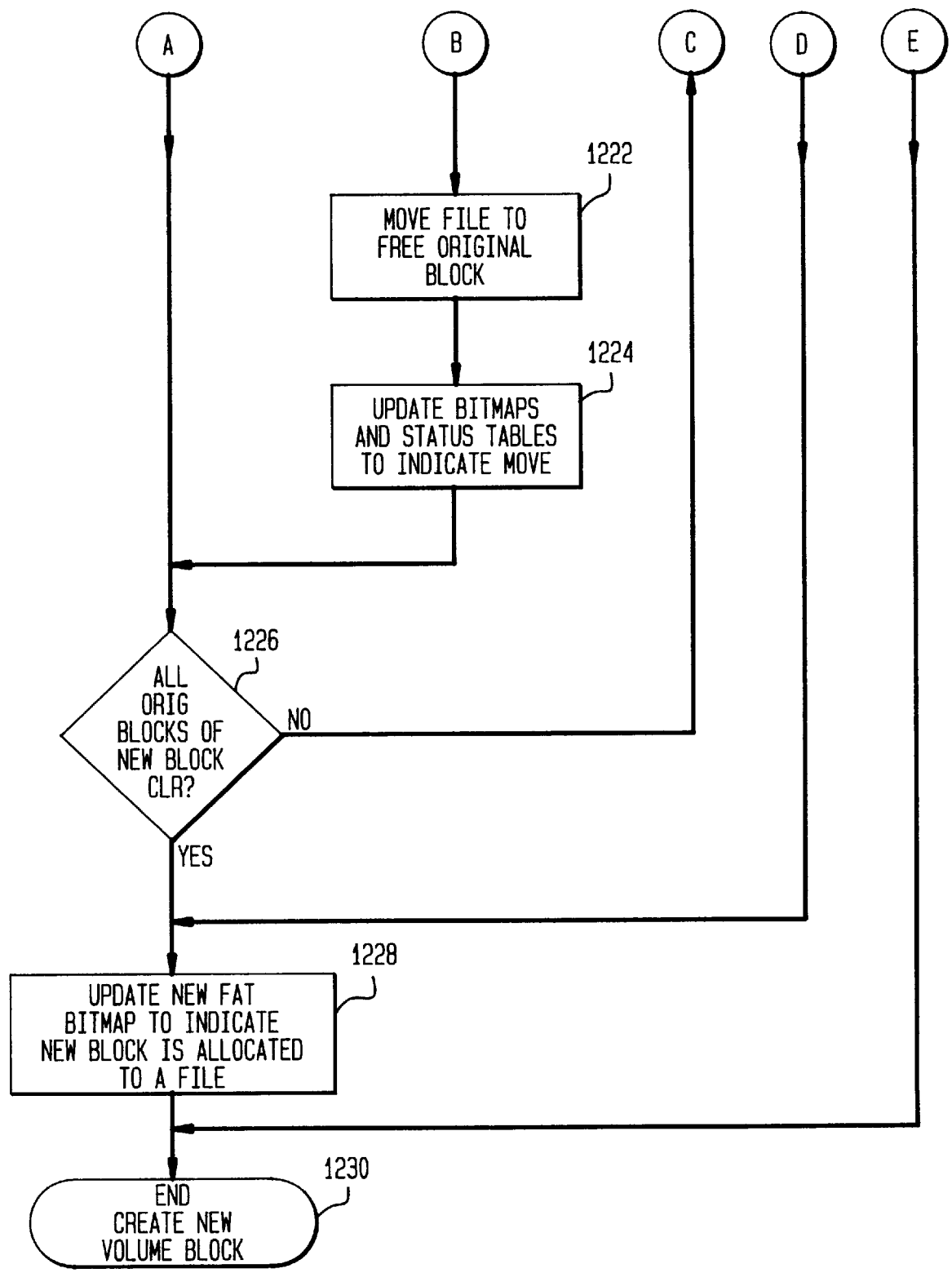

A flow chart of the processes performed at block 1106 to create a new volume block is illustrated in FIGS. 12A and 12B. Prior to realigning the files on the new volume block boundaries 408, the region on the disk starting at a new boundary and extending for the length of a new volume block (that is, the block ratio number of original volume block 212) must first be cleared. This process is invoked periodically as a new volume block 402 is needed to place a defragmented file on the new volume block boundaries 408.

At block 1204, the new volume FAT bit-map table 654 is scanned to locate a new volume block 402 that has no data stored in it. It is then determined at block 1206 whether available new blocks have been located. If it is determined that clear new volume blocks 402 are available, then processing continues at block 1228 whereat the new FAT bit-map 654 is updated to indicate that the identified new volume block 402 is now allocated to store in a file. On the other hand, if there are no new volume blocks available, then processing continues at block 1208 to clear a sufficient number of original volume blocks 212 to eventually make a new volume block 402 available.

At block 1208, the original volume FAT bit-map table 652 is scanned to locate an available original volume block 212. If it is determined at block 1210 that there are no original volume blocks 212 available, then an error is generated at block 1212 and processing ceases at end block 1230.

Once an original volume block 212 is located, then the location of the original volume block 212 in a new volume block 402 is determined at block 1214. The first original volume block 212 in the identified new volume block 402 is determined. An iterative process is then performed beginning at block 1216 to clear the series of original volume blocks 212 that are contained in the identified new volume block 402.

At block 1216, the next sequential original volume block 212 in the new volume block 402 is read to determine the contents of the original volume block. This determination is made by scanning the original volume FAT bit-map table 652 and directory entry bit-maps 656 and 658.

The contents of the original volume block 212, as determined in block 1216, determines what processes will then occur. If at block 1218 it is determined that the original volume block 212 contains a file having a size which is greater than or equal to a new volume block size 406 (that is, a large file), then this new volume block 402 is skipped since the data will likely be moved at a later time. Processing then continues at block 1204 to locate another new volume block 402.

If at block 1218 it is determined that the original volume block 212 contains a file which is smaller than the new volume block size 406 (that is, a small file), the processing continues at block 1220 to move the block to a clear location on the disk. At block 1220, the target volume 207 is scanned to locate a free original volume block 212 to place the contents of the current volume block 212. In a preferred embodiment of the present invention, the content of the original volume block 212 is moved to a location towards the back of the target volume 207. Accordingly, at block 1220 the original volume FAT bit-map table 652 is reverse scanned for a free original volume block 212. The file is then moved to this identified free original volume block at block 212. The original file allocation table 250, directory entry table 256, original volume FAT bit-map table 652 and new volume FAT bit-map table 654 are updated to reflect this rearrangement of original volume blocks 212 at block 1224. This series of steps 1220,1222 and 1224 therefore frees the original volume block 212 which was identified at block 1216.

Whether the original volume block 212 was cleared through this series of steps or was originally empty as determined by a block 1218, processing then continues at block 1226 whereat it is determined whether this is the last original volume block in the new volume block 402 which is being cleared. If not, processing continues at block 1216 and the above procedures are repeated until all of the original volume blocks 212 in the new volume block 416 are cleared. Once it is determined that all of the original volume blocks 212 of the new volume block 402 are clear, then processing continues at block 1228 whereat the new FAT bit-map table 608 is updated to indicate that this new volume block 402 which has just been cleared is now allocated to a new file. Processing then ceases at end block 1230.

Figure 13:
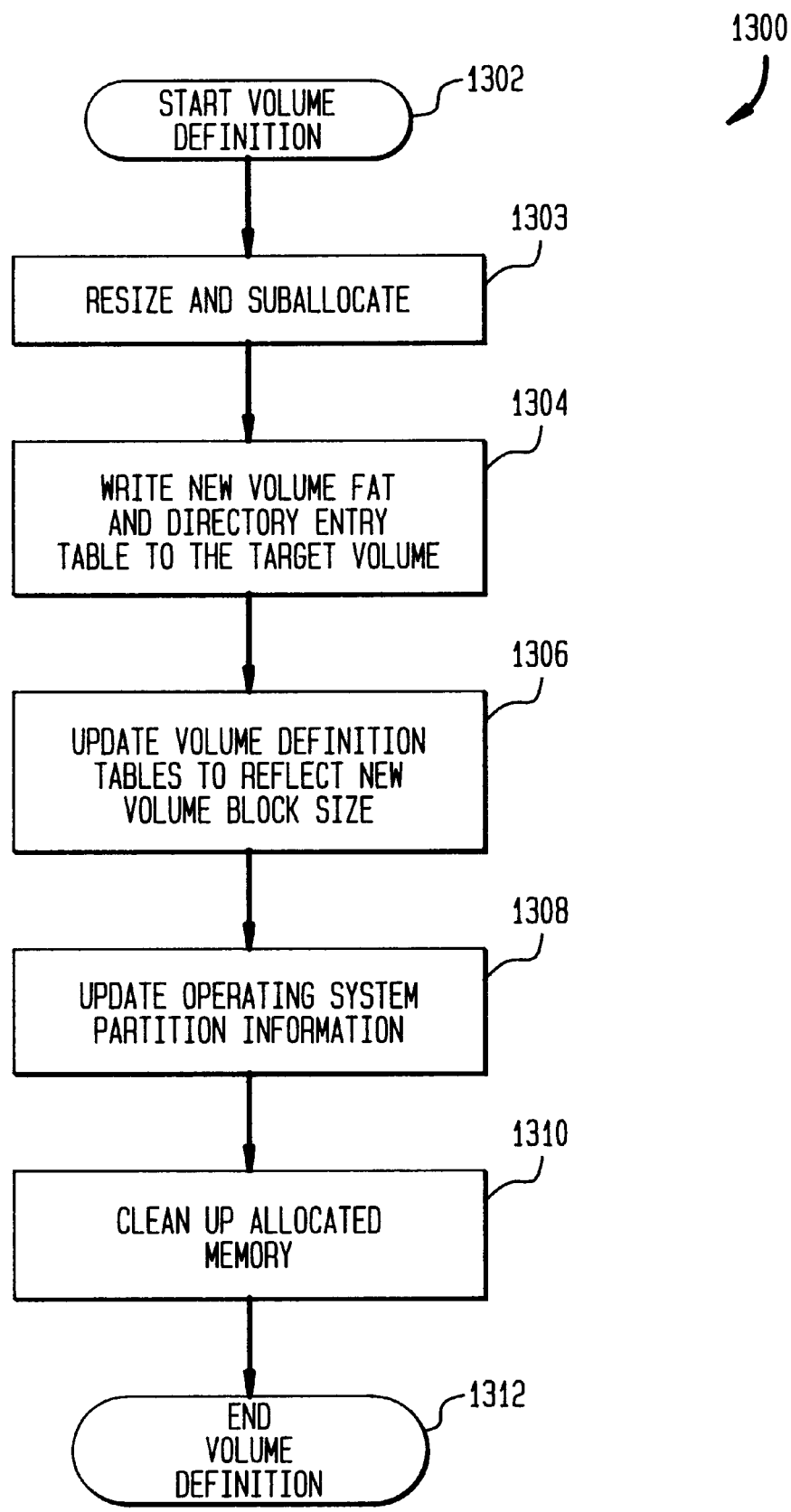
FIG. 13 is a flow chart of a preferred embodiment of a volume definition process performed in accordance with the present invention.

A flow chart of one embodiment of the volume definition process of the present invention is illustrated in FIG. 13. Once the files on the target volume 207 have been defragmented and realigned on the new volume block boundaries 408, the volume may then be redefined to effect the resizing process. This is considered to be a destructive phase of the volume block resizing process 800 of the present invention because the original file allocation table 250 will be replaced with the new file allocation table 702. Once this occurs, volume segment access based upon the original volume block size is no longer possible. Thus, in a preferred embodiment of the present invention, this process is not performed until the defragmentation and realignment process is completed. Small files and ending data fragments are suballocated at block 1303. As noted, the operating system 108 must be capable of recognizing suballocation to support this embodiment of the volume block resizer 102 of the present invention. The suballocation process which is implemented at block 1303 of the present invention uses the same suballocation techniques as that implemented by the operating system 108. For example, in the illustrative embodiment, the suballocation reserved blocks are configured in multiples of 512 byte increments. That is, there are suballocation reserve blocks for files and ending data fragments from 1 to 512 bytes, 513 to 1024 bytes, etc. Alternative arrangements are also possible. However, in order to enable the operating system 108 to begin normal processing upon completion of the volume block resizing process 800 of the present invention, the suballocation technique implemented at block 1303 is preferably the same as that implemented by the operating system 108. The resizing and suballocation process is described in detail below with reference to FIGS. 14–16. At block 1304, the new volume FAT table 702 and the directory entry table 256 are written to the target volume 207.

At block 1306, the volume definition tables 208 are updated to reflect the new volume block size 406. Then, at block 1308, the operating system partition information 203 is updated. Then, at block 1310, the portion of memory 110, which was used to perform the volume block resizing process 800 of the present invention, is cleared for normal use. Afterwards, the volume definition process 1300 of the present invention ceases at block 1312.

Figure 14:
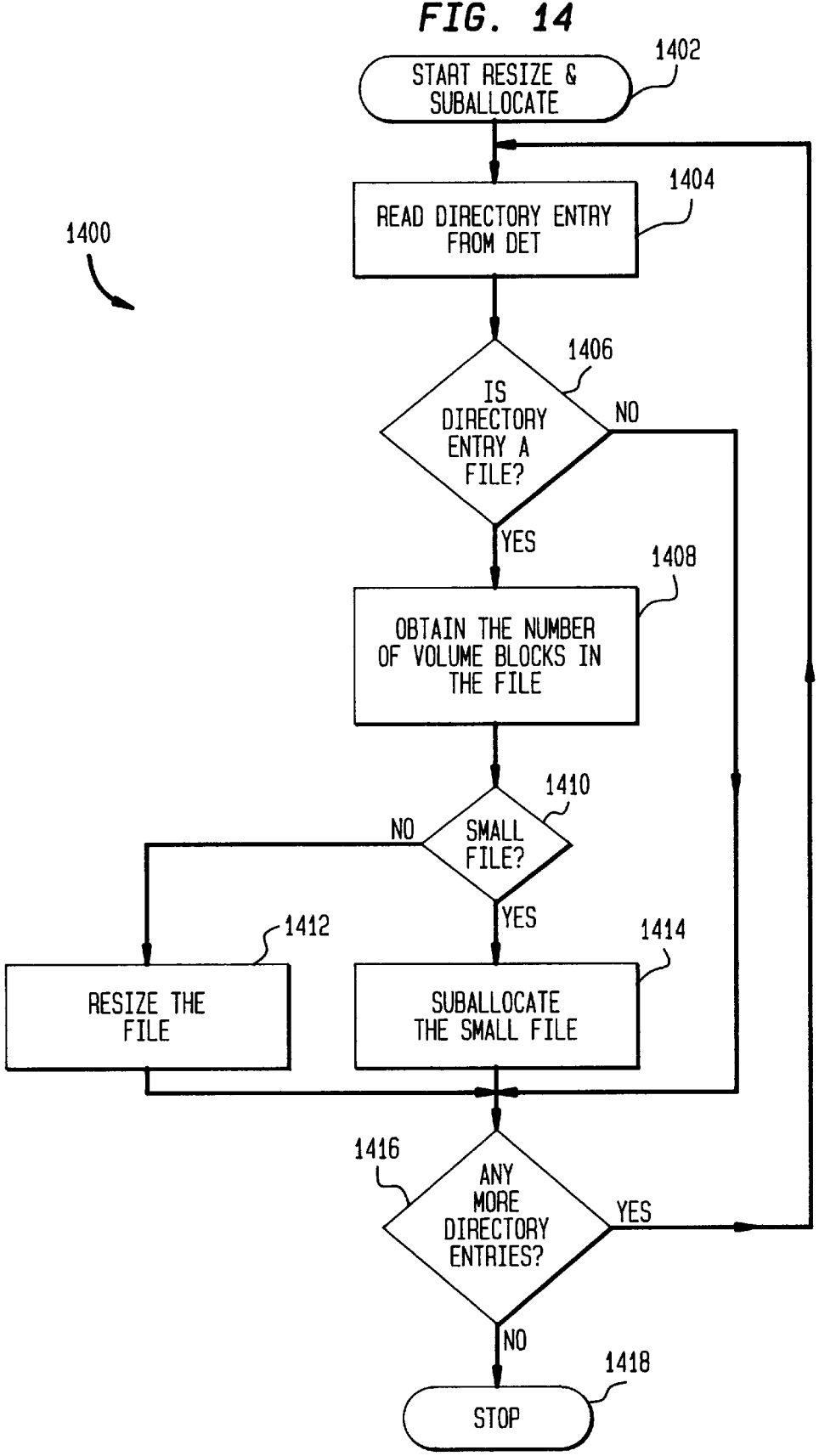
FIG. 14 is a high-level flow chart of a preferred embodiment of a resizing and suballocation process performed in accordance with the present invention.

FIG. 14 is a high-level flow chart of the volume resizing and suballocation process of the present invention introduced above at block 1303. After start block 1402, the directory entry 258 is read from the directory entry table 256 at block 1404. If it is determined at block 1406 that the directory entry is not a file, then processing continues at block 1416 discussed below. If the directory entry is a file, then processing continues at block 1408 wherein the number of volume blocks for the file is obtained from the file allocation table 250.

At block 1410, the number of blocks is compared to the new volume block size to determine whether the file is a large or small file. If the file is not a small file, then processing continues at block 1412 wherein the file is resized. This process is described below with reference to FIG. 15. However, if the file is a small file, then the file is suballocated at block 1414. This process is described in detail below with reference to FIG. 16.

The above process is continued for all of the directory entries 258 and the directory entry table 256 as shown by decision block 1516. Processing then completes at block 1418.

Figure 15:
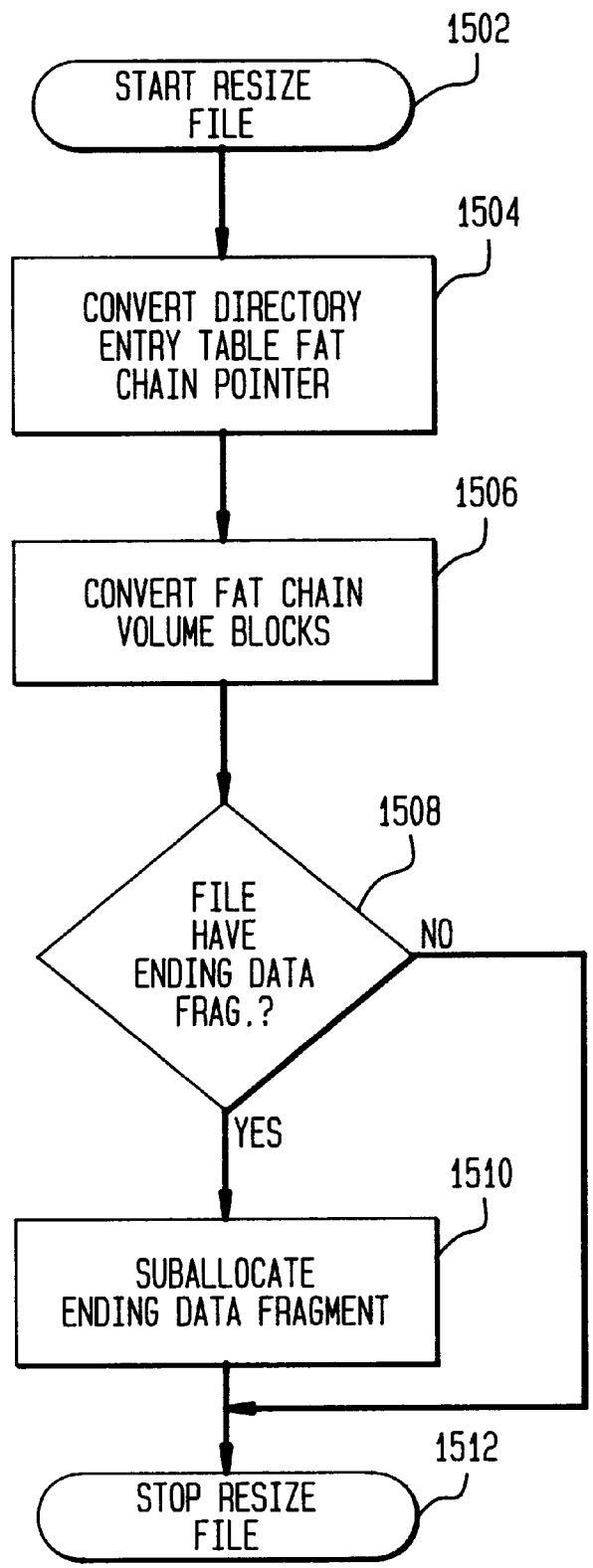
FIG. 15 is a flow chart of a preferred embodiment of a file resizing process performed in accordance with the present invention.

FIG. 15 is a flow chart of the file resizing process of the present invention introduced above at block 1412. After start block 1502, the FAT chain pointer 264 in the directory entry table 256 for each file 258 is converted to the new volume block size 1406. Since all of the files have been physically realigned on the new volume block boundaries 408, the directory entries 258 and file allocation tables must be changed in order to reference the proper new volume block 402.

At block 1504, the pointer 264 is divided by the block ratio to arrive at a pointer to the new volume block 402. At block 1506, the FAT chain 254 is sequentially converted to the new volume block size in a similar manner. If it is determined at block 1508 that the file has an ending data fragment, then processing continues at block 1510 wherein the ending data fragment is suballocated. This process is described in detail below with reference to FIG. 16. After the ending data fragment is suballocated at block 1510, or if there is no ending data fragment for the file being processed, then the resizing process is completed at block 1512. As noted above, processing then continues at block 1404 wherein the new volume FAT and directory entry tables are written to the target volume.

Figure 16:
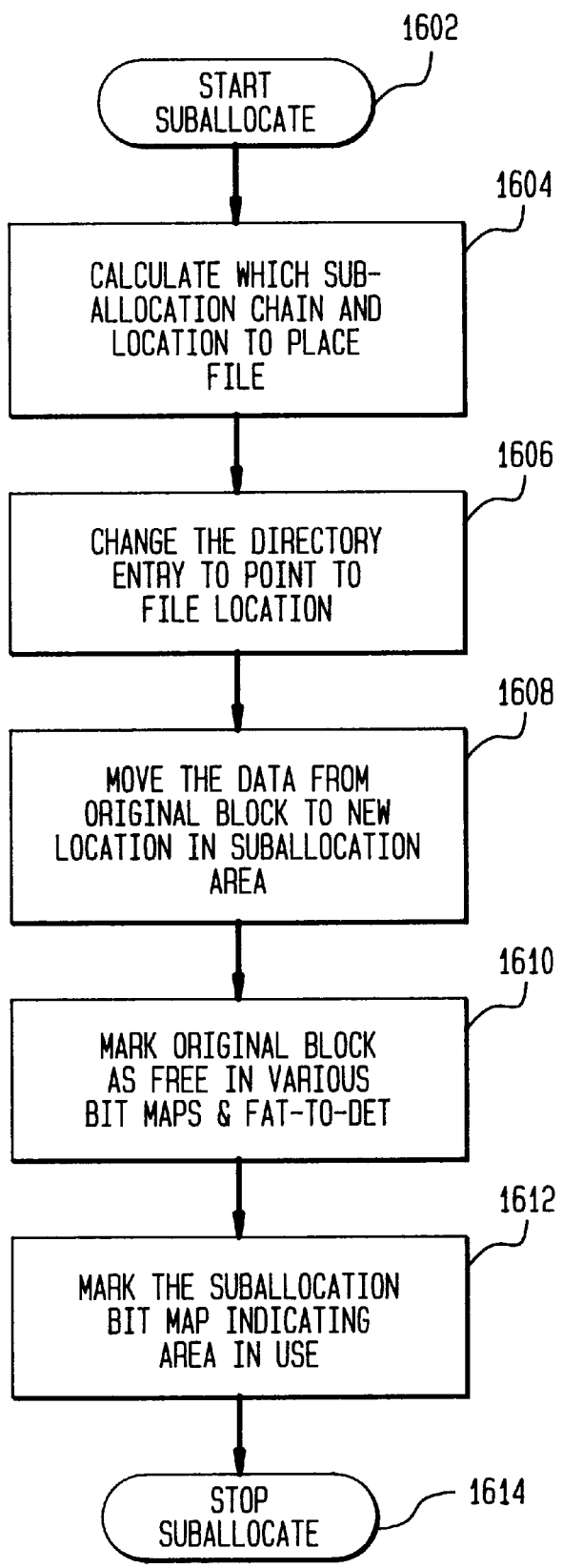
FIG. 16 is a flow chart of a preferred embodiment of an ending data fragment and small file suballocation process performed in accordance with the present invention.

FIG. 16 is a flow chart of the suballocation process of the present invention introduced above at blocks 1414 and 1510. At block 1604, the present invention determines which suballocation chain in which to place the file or ending data fragment. This determination is based upon the size of the ending data fragment or small file. In addition, since suballocation reserve blocks are dedicated to more than one file, and since there may be available sub-blocks within each SRB, the location within the SRB is also determined at block 1604.

Once the ending data fragment or small file has been placed into an SRB, then the directory entry table 256 is modified at block 1606 to point to the file location in the suballocation area. The data is then moved from the original volume block to the new location in the suballocation area at block 1608.

Once the data has been moved, then the bit-map 1652 and 1654 and the FAT-to-DET table 1602 table are modified to indicate that the original volume block is now free for use. Conversely, at block 1612, the appropriate suballocation bit-map 1660-1664 is marked to indicate that the suballocation field is now in use. Processing then ceases at stop block 1614.

While various embodiments of the present invention have been described above, it should be understood that they have been presented by way of example only, and not limitation. Many alternative embodiments of the present invention are contemplated. For example, in the illustrative embodiment, the new volume block size 406 is larger than the original volume block size 404. However, as one skilled in the relevant art would find apparent, the new volume block may have a size which is smaller than the original volume blocks. It is also understood that in the illustrative embodiment described above, the operating system is a network operating system in general, and NetWare® in particular. However, the present invention may work in any operating system environment as noted above. In addition, in the illustrative embodiment described above, the large files were defragmented and realigned before the small files and ending data fragments were suballocated. However, as one skilled in the relevant art would find apparent, the sequence of the process may be varied to achieve different performance criteria. For example, the suballocation of small files and ending data fragments may be done periodically during the defragmentation and realignment of larger files. Alternative sequences and methodology other than that described above is also considered to be within the scope of the present invention. In the embodiment described above, the system administrator accessed the target volume 207 through user interface 1112. If the operating system 108 does not support suballocation, then the present invention may defragment and realign all files rather than just the "large" files. That is, those processes and functions pertaining to suballocation would not be performed in such an embodiment of the volume block resizer 102. The implication of this description is that the volume block resizing process was performed on a single computer platform environment. However, as one skilled in the relevant art would find apparent, the volume block resizer of the present invention may be invoked remotely through an internetwork from a system administrator located at a remote node in the inter- or intra-network. Thus, the breadth and scope of the present invention should not be limited by any of the above-described exemplary embodiments, but should be defined only in accordance with the following claims and their equivalents.

What is claimed is:

1. A system for resizing a volume of a disk drive system, the original volume having original volume blocks with an original volume block size, the resized volume having new volume blocks with a new volume block size, the system comprising:

a disk analysis subsystem for obtaining volume-specific information from the disk drive system;

a file defragmentation and realignment subsystem for defragmenting files on the volume and realigning said defragmented files on new volume block boundaries, the file defragmentation and realignment subsystem simultaneously maintaining and using an original file allocation table containing FAT chains of the original volume blocks and a new file allocation table containing FAT chains of the new volume blocks; and a volume definition subsystem for redefining the volume for use with the new volume block size.

2. The system of claim 1, wherein said disk analysis subsystem accesses a partition information area and a volume definition area on the disk drive system to obtain said volume-specific information.

3. The system of claim 1, wherein said file defragmentation and realignment subsystem moves the original volume blocks to available locations on the volume to create a disk space to store said defragmented files on said new volume block boundaries.

4. The system of claim 1, wherein said file defragmentation and realignment subsystem selects new volume blocks that require a fewest number of original volume blocks to be moved.

5. The system of claim 1, wherein said file defragmentation and realignment subsystem does not move files which currently begin on a new volume block boundary and are of a size equal to or greater than the size of the new volume block.

6. The system of claim 3, wherein said file defragmentation and realignment subsystem moves original volume blocks and maintains an original file allocation table and a directory entry table.

7. The system of claim 6, wherein said volume definition subsystem updates the volume definition tables and partition information with new file allocation and directory entry tables reflecting the new volume block size.

8. The system of claim 1, wherein the new volume block size is user-selected from a plurality of possible volume block sizes.

9. The system of claim 3,
wherein said realigned and defragmented files include only files having a size equal to or greater than the new volume block size,
wherein files and ending data fragments smaller than said new volume block size are suballocated.

10. The system of claim 1, wherein system files are defragmented and aligned so that they are contiguous on the new volume block boundaries.

11. The system of claim 1, wherein said system files includes the file allocation table and directory entry table.

12. The system of claim 1, wherein said volume block resizer is implemented in a stand-alone computer system.

13. The system of claim 1, wherein said volume block resizer is implemented in a node of a distributed network.

14. A system for resizing a volume in a disk drive system, the original volume including original volume blocks having each having an original volume block size, and the resized volume including new volume blocks each having a new volume block size, the system comprising:
   first means for automatically aligning files contiguously on new volume block boundaries, said first means simultaneously maintaining and using an original file allocation table and a new file allocation table; and
   second means for redefining the volume for use with the new volume block size.

15. The system of claim 14, wherein said first means comprises:
   means for moving original volume blocks to available locations on the volume to create disk space to store said defragmented files on said new volume block boundaries.

16. The system of claim 14, wherein said first means moves original volume blocks and maintains an original file allocation table and a directory entry table.

17. The system of claim 16, wherein said second means comprises:
   means for updating the volume definition tables and partition information with new file allocation and directory entry tables reflecting the new volume block size.

18. The system of claim 17, wherein the new volume block size is user-selected from a plurality of possible volume block sizes.

19. The system of claim 18,
wherein said realigned and defragmented files include only files having a size equal to or greater than the new volume block size, and
wherein files and ending data fragments smaller than said new volume block size are suballocated.

20. A method for resizing a volume of a disk drive system, the original volume including original volume blocks each having an original volume block size, the resized volume including new volume blocks each having a new volume block size, the method comprising the steps of:
   a) analyzing the disk drive system to obtain volume-specific information;
   b) contiguously realigning files on new volume block boundaries while simultaneously maintaining and using an original file allocation table containing FAT chains of the original volume blocks and a new file allocation table containing FAT chains of the new volume blocks; and
   c) resizing the volume.

21. The method of claim 20, wherein said step b) is performed on system files and data files.

22. The method of claim 20, wherein said step b) is performed only on large data files.

23. The method of claim 22, wherein said step b) includes the step of:
   1) suballocating files and ending data fragments that are smaller than the new volume block size.

24. The method of claim 20, wherein said step a) comprises the steps of:
   1) obtaining current disk and volume information from the disk drive system;
   2) selecting an unmounted volume as the volume to resize;
   3) locking said selected unmounted volume; and
   4) implementing suballocation.

25. The method of claim 24, further comprising the steps of:
   4) scanning local memory to verify that a sufficient amount of memory locations are available to resize the volume.

26. The method of claim 25, further comprising the steps of:
   5) performing disk and volume calculations based upon the information obtained from the disk drive system; and
   6) determine whether a sufficient amount of the volume blocks are available to resize the volume.

27. The method of claim 24, wherein said step a) 1) includes the step of:
   (a) creating status tables to store said current disk and volume information.

28. The method of claim 24, wherein said step a) 2) includes the steps of:
   (a) providing, through a user interface, an indication of the volumes which are unmounted in the disk drive system; and
   (b) receiving through said interface, a selected mounted volume.

29. The method of claim 28, wherein said step a) 1) includes the steps of:
   (a) creating the directory block table containing pointers to the directory blocks;
   (b) creating original and new FAT bit-maps;
   (c) creating directory entry bit-maps indicating whether the directory entry is a the associated directory entry is greater and lesser than the new volume block size.

30. The method of claim 20, wherein said step b) comprises the steps of:
   1) aligning files that are equal to or greater than the new volume block size contiguously onto new volume block boundaries.

31. The method of claim 30, wherein said step b) further comprises the step of:
   2) defragmenting and realigned volume management files on new volume block boundaries.

32. The method of claim 30, wherein said step b) 1) comprises, for a current file to be defragmented and realigned, the steps of:
   (a) retrieving a FAT chain from the original file allocation table for the current file;
   (b) creating a new volume block to place the current file, said new volume block starting at a new boundary and extending for a number of original volume blocks;
   (c) moving the original volume blocks of the current file into the new volume block created at said step (b);

(d) updating the various tables and bit-maps to indicate each block move; and (e) updating the new FAT bit-map if said step (c) resulted in a new volume block becoming available.

33. The method of claim 32, wherein said step b) 1) (b) of creating a new volume block comprises:

(1) scanning the new volume FAT bit-map table to locate a new volume block that has no data stored in it;

(2) updating, if a new volume block is identified in said step 1), the new FAT bit-map to indicate that the identified new volume block is now allocated to store in a file;

(3) clearing, if there are no new volume blocks available, a sufficient number of original volume blocks to make a new volume block 402 available;

(4) updating the new FAT bit-map table to indicate that this new volume block which has just been cleared is now allocated to a new file.

34. The method of claim 20, wherein said step c) comprises the steps of:

1) writing the new volume FAT table and the directory entry table are written to the resized volume;

2) updating the volume definition tables to reflect the new volume block size; and 3) updating the operating system partition information to reflect the new volume block size.

35. The system of claim 1, wherein said file defragmentation and realignment subsystem utilizes a ratio of the original volume block size to the new volume block size to determine a quantity of original volume blocks to manipulate.

36. The system of claim 14, wherein said second means redefines the volume based upon a ratio between the original volume block size and the new volume block size.

37. The method of claim 1, wherein said step b) is performed based upon a ratio between the original volume block size and the new volume block size.

* * * * *